United States Patent
Matsuzaki et al.

(10) Patent No.: US 7,349,770 B2
(45) Date of Patent: Mar. 25, 2008

(54) VEHICLE CONTROL SYSTEM

(75) Inventors: Haruki Matsuzaki, Obu (JP);
Tomoyuki Kashiwagi, Chita-gun (JP);
Masaaki Shinojima, Chiryu (JP);
Masashi Hori, Anjo (JP)

(73) Assignees: Denso Corporation, Kariya (JP);
Nippon Soken, Inc., Nishio (JP)

( * ) Notice: Subject to any disclaimer, the term of this patent is extended or adjusted under 35 U.S.C. 154(b) by 0 days.

(21) Appl. No.: 11/441,093

(22) Filed: May 26, 2006

(65) Prior Publication Data
US 2006/0271260 A1 Nov. 30, 2006

(30) Foreign Application Priority Data
May 31, 2005 (JP) .............................. 2005-159506

(51) Int. Cl.
*G06F 7/00* (2006.01)
(52) U.S. Cl. .................. 701/1; 701/51; 701/63
(58) Field of Classification Search .................... 701/1, 701/23, 29, 31, 34, 36, 51, 63
See application file for complete search history.

(56) References Cited

U.S. PATENT DOCUMENTS

| | | | | |
|---|---|---|---|---|
| 5,950,597 | A * | 9/1999 | Kamio et al. ................ | 123/397 |
| 6,139,468 | A * | 10/2000 | Goates et al. ................. | 477/97 |
| 6,226,580 | B1 | 5/2001 | Noro et al. | |
| 6,230,576 | B1 | 5/2001 | Yamada et al. | |
| 6,410,993 | B1 * | 6/2002 | Giers ........................ | 307/10.1 |
| 6,853,887 | B1 * | 2/2005 | Greenwell ..................... | 701/1 |
| 6,885,927 | B2 * | 4/2005 | Arimura ...................... | 701/41 |
| 6,913,226 | B2 * | 7/2005 | Huynh ............................. | 1/1 |
| 2005/0092292 | A1 | 5/2005 | Kamimura et al. | |

FOREIGN PATENT DOCUMENTS

| | | |
|---|---|---|
| JP | 5-272633 | 10/1993 |
| JP | 2004-230952 | 8/2004 |
| JP | 2004-268754 | 9/2004 |
| JP | 2004-338563 | 12/2004 |
| JP | 2005-263182 | 9/2005 |

\* cited by examiner

*Primary Examiner*—Mark Hellner
(74) *Attorney, Agent, or Firm*—Nixon & Vanderhye P.C.

(57) ABSTRACT

A vehicle control system is disclosed. The vehicle control system includes a by-wire system with an actuator for changing vehicle conditions and a by-wire control circuit that electrically controls the actuator according to a command for changing the vehicle conditions by a vehicle passenger. The vehicle control system further includes a monitoring control device having a control circuit that is different from the by-wire control circuit and that monitors the by-wire system on the basis of monitoring information received from the by-wire system. The vehicle control system also includes an inhibiting device that inhibits the control of the actuator by the by-wire control circuit on receiving a control command from the monitoring control device when the monitoring control device confirms a fault of the by-wire system.

17 Claims, 26 Drawing Sheets

VEHICLE CONTROL SYSTEM

CROSS REFERENCE TO RELATED APPLICATION

This application is based on Japanese Patent Application No. 2005-159506 filed on May 31, 2005, the disclosure of which is incorporated herein by reference.

FIELD OF THE INVENTION

The present invention generally relates to a vehicle control system and, more particularly, relates to a vehicle control system including a by-wire system.

BACKGROUND OF THE INVENTION

In the field of vehicle control, by-wire systems are proposed which electrically control an actuator for changing vehicle conditions by a by-wire control circuit according to commands from a vehicle passenger. Examples of these by-wire systems include a drive-by-wire system (e.g., Japanese Patent Application No. 2005-133624A, U.S. Patent Publication No. 2005/0092292A1) that changes throttle openings of an engine according to commands from a vehicle passenger, a shift-by-wire system (e.g., Japanese Patent Application No. 2004-230952A) that changes ranges of an automatic transmission according to commands, and a steering-by-wire system (e.g., Japanese Patent Application No. 2004-268754) that changes steering angles of a vehicle steering shaft according to commands.

The drive-by-wire system described above can prevent a sudden engine stall by ensuring a minimum throttle opening by the mechanical workings of an engine, even when an actuator realizes a throttle opening contrary to the intention of a vehicle passenger.

On the other hand, in the shift-by-wire system described above, when a fault occurs and the actuator fixes a range that is contrary to the intention of the vehicle passenger, the vehicle may remain running, thereby creating a potential hazard. Likewise, in the steering-by-wire system, when a fault occurs and the actuator fixes the steering angle to an angle that is contrary to the intention of the vehicle passenger, the vehicle may remain running, thereby creating a potential hazard.

SUMMARY OF THE INVENTION

Accordingly, a vehicle control system is disclosed. The vehicle control system includes a by-wire system with an actuator for changing vehicle conditions and a by-wire control circuit that electrically controls the actuator according to a command for changing the vehicle conditions by a vehicle passenger. The vehicle control system further includes a monitoring control device having a control circuit that is different from the by-wire control circuit and that monitors the by-wire system on the basis of monitoring information received from the by-wire system. The vehicle control system also includes an inhibiting device that inhibits the control of the actuator by the by-wire control circuit on receiving a control command from the monitoring control device when the monitoring control device confirms a fault of the by-wire system.

DETAILED DESCRIPTION OF THE PREFERRED EMBODIMENTS

Hereinafter, plural embodiments of the present invention will be described with reference to the accompanying drawings. Descriptions below refer to "electronic control unit" simply as ECU.

First Embodiment

Figure 1:
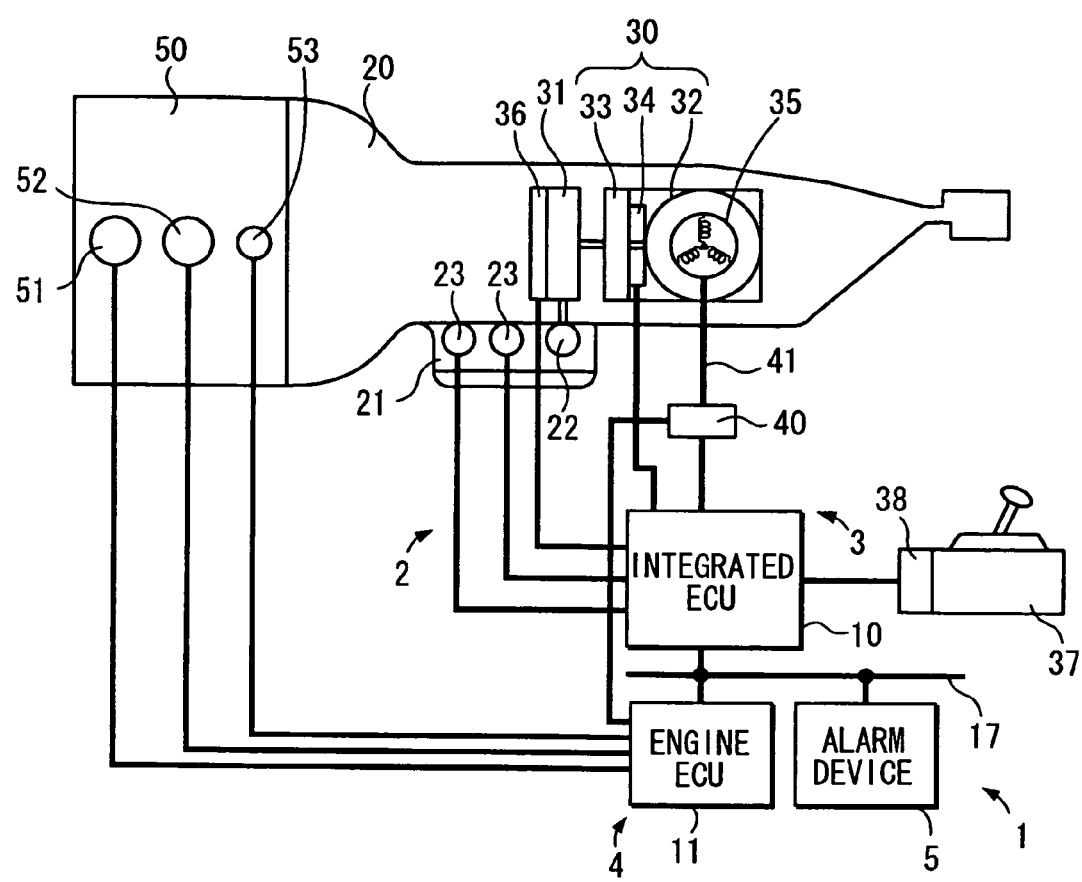
FIG. 1 is a block diagram showing a vehicle control system according to a first embodiment.

FIG. 1 shows a vehicle control system 1 according to a first embodiment of the present invention. The vehicle control system 1 is mounted in a vehicle and comprises an automatic transmission control system 2, a shift-by-wire system 3, an engine control system 4, and an alarm device 5.

An ECU 10 and an ECU 11 are included. The ECU 10 and ECU 11 are electrical devices such as microcomputers and are electrically or optically connected with each other via a vehicle LAN line 17. The control function for the automatic transmission control system 2 and the control function for the shift-by-wire system 3 are integrated in the ECU 10. In the descriptions below, "ECU 10 which integrates the control functions of the automatic control system 2 and the shift-by-wire system 3" is referred to as an integrated ECU 10, and "ECU 11 of the engine control system 4" is referred to as an engine ECU 11.

The automatic transmission control system 2 includes a hydraulic circuit 21 that drives an automatic transmission 20 of the vehicle by output pressures to change ranges and speed changing stages of the automatic transmission. The automatic transmission 20 has running ranges (i.e., gears) such as a forward range (D) and a reverse range (R), and non-running ranges such as a parking range (P) and a neutral range (N). A manual valve 22 of the hydraulic circuit 21 realizes ranges corresponding to spool movement positions. The automatic transmission 20 includes plural friction elements engaged at any one of the ranges, and the friction elements are driven according to output oil pressures of respectively corresponding electromagnetic valves 23 in the hydraulic circuit 21. In the hydraulic circuit 21, electrical components such as the plural electromagnetic valves 23 are electrically connected to the integrated ECU 10. Accordingly, the integrated ECU 10 selects a friction element to be engaged, by electrically controlling an output oil pressure of each electromagnetic valve 23.

The shift-by-wire system 3 includes an actuator 30 that drives the manual valve 22 of the automatic transmission control system 2, and a conversion module 31. The electromagnetically driven actuator 30 comprises an electric motor 32, a speed reducer 33, and rotational angle sensor 34. The electric motor 32 includes a driving part 35 formed by connecting plural coils arrayed in a rotation direction, and produces rotational driving force in an output shaft according to conduction to the driving part 35. The speed reducer 33 outputs increased rotational driving force of an output shaft of the electric motor 32 to the conversion module 31. The conversion module 31 converts the rotational driving force outputted from the speed reducer 33 to linear driving force to control the position of the manual valve 22. In this way, ranges of the automatic transmission 20 can be controlled according to rotational angles of the electric monitor 32.

The driving part 35 and the rotational angle sensor 34 of the electric motor 32 are electrically connected to the integrated ECU 10. A range sensor 36 of the conversion module 31 and a selector sensor 38 of a range selector 37 of the vehicle are also electrically connected to the integrated ECU 10. The rotational angle sensor 34, which comprises a rotary encoder and the like, detects a rotational angle of the output shaft of the electric motor 32 and outputs the detection signal to the integrated ECU 10. Since the range of the rotational angle sensor 34 changes according to a rotational angle of the electric motor 32 as described previously, a rotational angle detected by the rotational angle sensor 34 indirectly indicates an actual range realized by the automatic transmission 20. The range sensor 36 detects an actual range, on the basis of a rotational angle of an input shaft of the conversion module 31, and the position of the output shaft of the conversion module 31 or the manual valve 22, and outputs the detection signal to the integrated ECU 10. The selector sensor 38 detects a command value of a range inputted by a vehicle passenger using the range selector 37 of lever type or button type, and outputs the detection signal to the integrated ECU 10. In this way, the integrated ECU 10 that receives detection signals from the sensors 34, 36, and 38 controls conduction to the electric motor 32, on the basis of the detection signals.

The shift-by-wire system 3 further includes a switch device 40. The switch device comprising a relay and the like is provided on a conduction path 41 that connects the integrated ECU 10 and the driving part 35 of the electric motor 32. Therefore, when the switch device 40 is turned on, the conduction path 41 is closed and conduction to the electric motor 32 is permitted by the integrated ECU 10, while when the switch device 40 is turned off, the conduction path 41 is broken and conduction to the electric motor 32 is inhibited by the integrated ECU 10.

Figure 2:
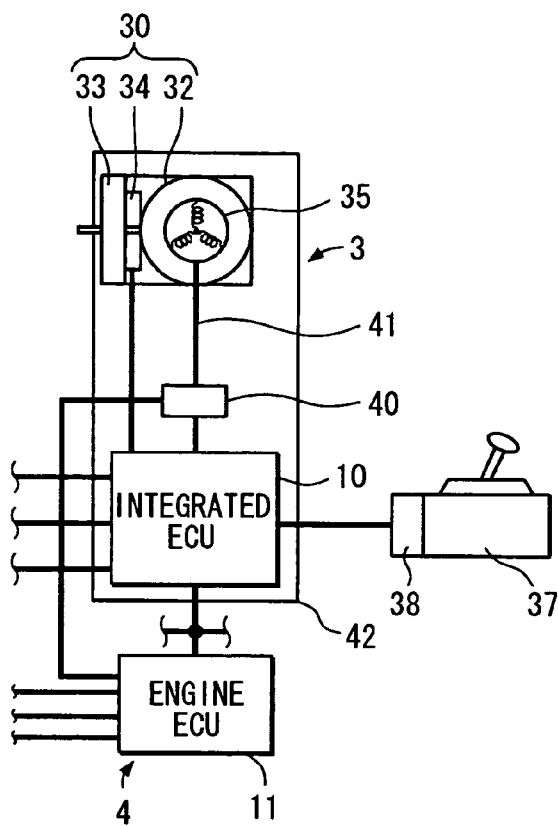
FIG. 2 is a block diagram showing a shift-by-wire system according to a variant of the first embodiment.
Figure 3:
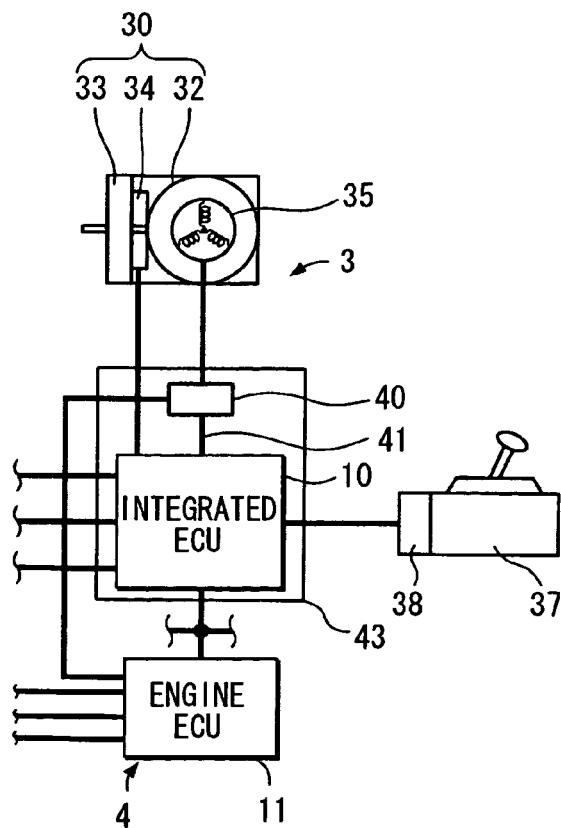
FIG. 3 is a block diagram showing a shift-by-wire system according to a variant of the first embodiment.

As shown in FIG. 1, in this embodiment, by separating the components 10, 30, 31, and 40 of the shift-by-wire system 3 from one another, the disposition freedom of the components in the vehicle is increased. On the other hand, as shown in FIG. 2, the integrated ECU 10, the actuator 30, and the switch device 40 may be housed in an identical housing 42 to integrate them. As another example, as shown in FIG. 3, the integrated ECU 10 and the switch device 40 may be housed in an identical housing 43 to integrate them. By thus integrating plural components of the shift-by-wire system 3, the mountability of the components in the vehicle is increased.

As shown in FIG. 1, the engine ECU 11 constructing the engine control system 4 is electrically connected to a throttle device 51, a fuel injection valve 52, and an accelerator 53 of a vehicle engine 50. The throttle device 51 adjusts a throttle opening degree in an intake passage of the engine 50. The accelerator 53 outputs a signal indicating an operation quantity of a vehicle accelerator pedal to the engine ECU 11. By this construction, the engine ECU 11 electrically controls the throttle device 51 and the fuel injection valve 52 according to the operation of the accelerator pedal by the vehicle passenger, and thereby adjusts engine torque. The engine ECU 11 has an automatic control function that controls the throttle device 51 and the fuel injection valve 52 independently of the operation of the accelerator pedal.

The engine ECU 11 is further connected to the switch device 40 of the shift-by-wire system 3, and electrically controls the switch device 40 to turn it on or off. The engine ECU 11 in this embodiment receives monitoring information for monitoring the shift-by-wire system 3 via the vehicle LAN line 17 from the integrated ECU 10, and controls the switch device 40, on the basis of the monitoring information. Therefore, the engine ECU 11 can permit or inhibit the control of conduction to the electric motor 32 by the integrated ECU 10 by giving an on-control command or an off-control command to the switch device 40.

The alarm device 5 is electrically or optically connected to the vehicle LAN line 17. The alarm device 5 receives a command from other electrical components connected to the vehicle LAN line 17 and notifies the vehicle passenger of specified vehicle conditions according to the command. The alarm of the vehicle conditions may be made by a display on an instrument panel of the vehicle, sound from a speaker of the vehicle, a combination of the display and the sound, or any other suitable device.

Figure 4:
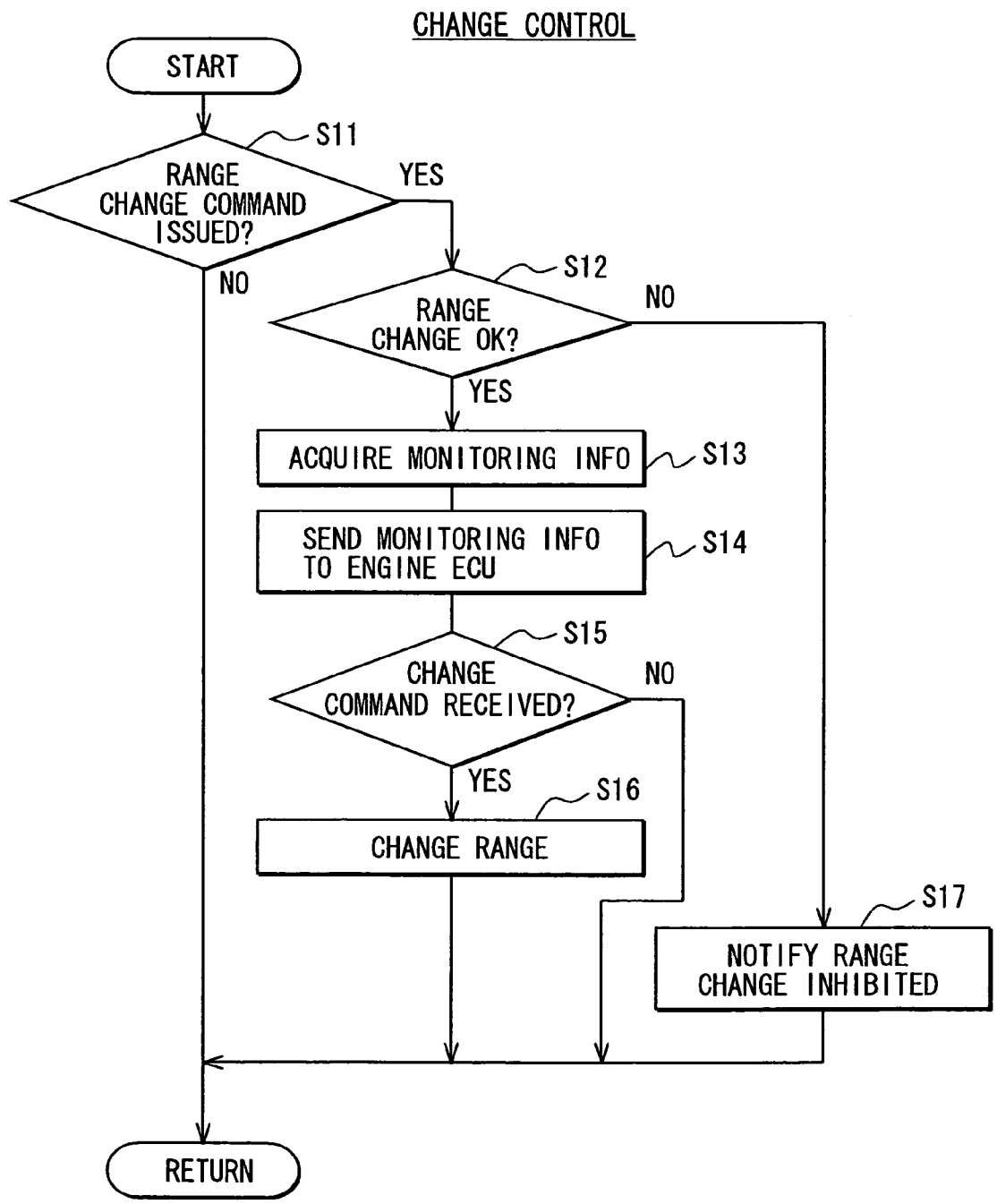
FIG. 4 is a flowchart showing a change control flow according to the first embodiment.

With reference to FIG. 4, the following describes a change control flow performed by the integrated ECU 10 to change ranges of the automatic transmission 20. The control flow is started when the engine ECU 11 is in a normal condition and an ignition switch of the vehicle is turned on by the vehicle passenger, and terminated when the ignition switch is turned off by the vehicle passenger.

In Step S11 of the change control flow, the integrated ECU 10 determines whether a range change command has been issued from the vehicle passenger, from a detection signal of the selector sensor 38. When a negative determination has been made, the integrated ECU 10 executes Step S11 again without executing other steps. On the other hand, when affirmative determination has been made in Step S11, the integrated ECU 10 determines in Step S12 whether range change is permitted. Specifically, in one embodiment of Step S12, the integrated ECU 10 confirms that vehicle can stop and that the vehicle brakes are operating properly. If the integrated ECU 10 determines that the vehicle is operating properly, then the range change is permitted, and an affirmative determination is made in Step S12. If the ECU 10 determines that the vehicle is operating improperly, then range change is inhibited, and a negative determination is made in Step S12.

When affirmative determination has been made in Step S12, the integrated ECU 10 acquires, in Step S13, monitoring information for allowing the engine ECU 11 to monitor the shift-by-wire system 3. Specifically, the monitoring information includes an actual range at the time of execution in Step S13, a target range specified in the range change command identified in Step S11, and a target rotation direction of the electric motor 32. (Hereinafter "a target rotation direction of the electric motor 32" will be referred to simply as "a target rotation direction"). The actual range is acquired on the basis of detection signals of the rotational angle sensor 34 and the range sensor 36, and the target range is acquired on the basis of a detection signal of the selector sensor 38. The target rotation direction is acquired on the basis of the actual range and the target range thus acquired.

Next, in Step S14, the integrated ECU 10 sends the monitoring information acquired in Step S13 to the engine ECU 11. Then, in Step S15 it is determined whether a change permission command (detailed later) has been received from the engine ECU 11 within a predetermined amount of time. When affirmative determination has been made, the integrated ECU 10 changes a range in Step S16 by feedback-controlling conduction to the electric motor 32 so that the actual range matches the target range, and then executes Step S11 again. On the other hand, when negative determination has been made in S15, the integrated ECU 10 executes Step S11 again without executing Step S16.

Hereinbefore, the flow when affirmative determination has been made in Step S12 has been described. On the other hand, when negative determination has been made in Step S12 (i.e., when a determination to inhibit range change has been made) the integrated ECU 10 executes Step S17. In Step S17, by controlling the alarm device 5 connected via the vehicle LAN line 17, the integrated ECU 10 notifies the vehicle passenger that range change is inhibited. Then, the integrated ECU 10 executes Step S11 again.

Figure 5:
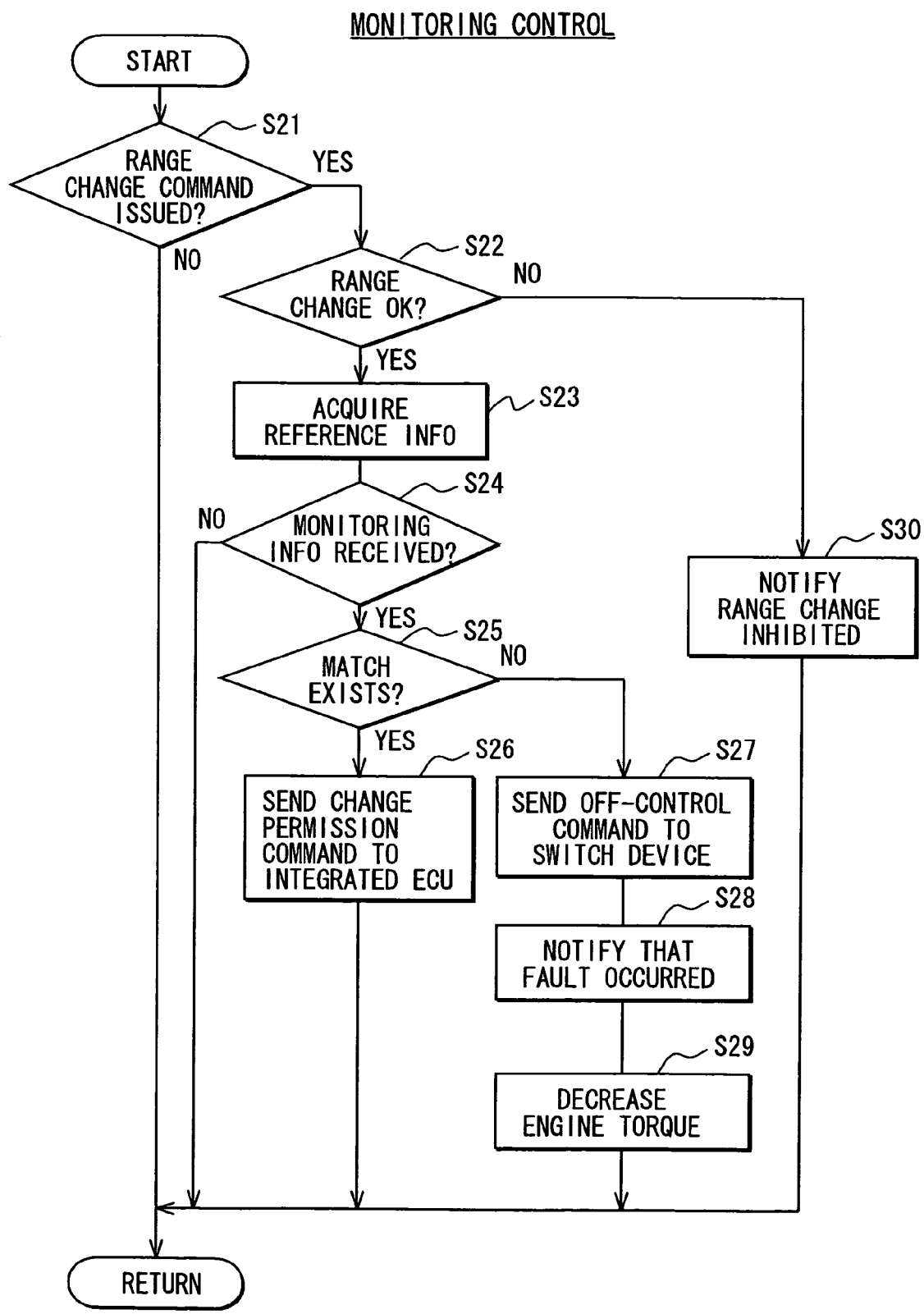
FIG. 5 is a flowchart showing a monitoring control flow according to the first embodiment.

With reference to FIG. 5, the following describes a monitoring control flow method executed by the engine ECU 11 to monitor the shift-by-wire system 3. The monitoring flow is started when the engine ECU 11 is in a normal condition and the ignition switch of the vehicle is turned on by the vehicle passenger, and terminated when the ignition switch is turned off by the vehicle passenger.

In Step S21 of the monitoring control flow method, the engine ECU 11 determines whether a range change command has been issued from the vehicle passenger from a detection signal of the selector sensor 38 received via the integrated ECU 10. If a negative determination has been made in Step S21 the engine ECU 11 executes Step S21 again without executing other steps. On the other hand, if affirmative determination has been made in Step S21, the engine ECU 11 executes Step S22 having processing contents similar to Step S12 of the above-described change control flow method.

When affirmative determination has been made in Step S22, the engine ECU 11 acquires, in Step S23, reference information used as reference for monitoring the shift-by-wire system 3. Specifically, the reference information includes an actual range at the time of execution of Step S23, a target range specified in the range change command identified in Step S21, and a target rotation direction. The actual range is acquired on the basis of detection signals of the rotational angle sensor 34 and the range sensor 36 received via the integrated ECU 10, and the target range is acquired on the basis of a detection signal of the selector sensor 38 received via the integrated ECU 10. The target rotation direction is acquired on the basis of the actual range and the target range thus acquired.

In Step S24 subsequent to Step S23, the engine ECU 11 determines whether the monitoring information has been received from the integrated ECU 10 within a set time. As a result, when negative determination has been made, the engine ECU 11 executes Step S21 again. On the other hand, when affirmative determination has been made in Step S24, the engine ECU 11 compares, in Step S25, the monitoring information with the reference information acquired in Step S23, and determines whether they match. More specifically, a match will occur if the actual range in the monitoring information matches the actual range in the reference information, the target range in the monitoring information matches the target range in the reference information, and the target rotation direction in the monitoring information matches the target rotation direction in the reference information.

Step S26 occurs if an affirmative determination has been made in Step S25, and the engine ECU 11 sends a change permission command to the integrated ECU 10. Then, Step S21 occurs again.

On the other hand, when negative determination has been made in Step S25, the engine ECU 11 gives, in Step S27, an off-control command to the switch device 40 to inhibit the control of conduction to the electric motor 32 by the integrated ECU 10. In Step S28, the engine ECU 11 notifies the vehicle passenger of a fault of the integrated ECU 10 by controlling the alarm device 5 connected via the vehicle LAN line 17. Then, in Step S29, the engine ECU 11 decreases engine torque by directly controlling the throttle device 51 and the fuel injection valve 52 of the engine 50, and then executes Step S21 again. In Step S29, the engine ECU 11 decreases engine torque so that an engine rotational speed is almost equal to an idle rotating speed or below a set rotating speed higher than it, or the engine 50 stops.

On the other hand, when negative determination has been made in Step S22 (i.e., when a determination to inhibit range change has been made), the engine ECU 11 executes Step S30 having processing contents similar to Step S17 of the above-described change control flow.

According to the first embodiment, on confirming a fault of the shift-by-wire system 3, the engine ECU 11 inhibits the control of conduction to the electric motor 32 by the integrated ECU 10 by electrically controlling the switch device 40. A fault of the shift-by-wire system 3 is determined by comparing the actual range, target range, and rotation direction determined as reference information by the engine ECU 11 with the actual range, target range, and rotation direction determined as monitoring information by the integrated ECU 10. Therefore, since the engine ECU 11 can correctly determine a fault difference between the determination of the engine ECU 11 and the determination of the integrated ECU 10, and inhibit the control of conduction to the electric motor 32 on the basis of the correct determination result, the engine ECU 11 can stop the electric motor 32 before the actuator 30 realizes a range contrary to the intention of the vehicle passenger. Particularly in the first embodiment, since the control of conduction to the electric motor 32 can be inhibited by blocking the conduction passage 41 between the integrated ECU 10 and the electric motor 32 via the switch device 40, the electric motor 32 is stopped.

In the first embodiment, on confirming a fault of the shift-by-wire system 3, the engine ECU 11 not only inhibits the control of conduction to the electric motor 32 but also decreases engine torque. Accordingly, when a fault occurs when the vehicle is running, the vehicle slows down. Furthermore, in the first embodiment, since the engine ECU 11 controls the switch device 40 and engine 50, engine conduction control can be more reliably inhibited and engine torque can be more reliably decreased. Thus, the safety of the vehicle is ensured.

In addition, the engine ECU 11 in the first embodiment can also be used such vehicle condition information, for example, in Step S22 of the monitoring control flow. Therefore, an increase in costs due to addition of electrical circuits and the like to acquire vehicle condition information can be prevented. Furthermore, it can be considered that the integrated ECU 10 and the engine ECU 11 are connected in series to the selector sensor 38 in that order. Therefore, when the engine ECU 11 fails, the integrated ECU 10 can effectuate range changes by controlling the actuator 30 without relying on the engine ECU 11.

In the first embodiment, ranges of the automatic transmission 20 correspond to "vehicle conditions" described in the claims, and the integrated ECU 10 corresponds to "a by-wire control circuit" described in the claims. Also, in the first embodiment, the engine ECU 11 corresponds to "a control circuit other than the by-wire control circuit," "monitoring control device," and "engine control circuit" described in the claims, and the switch device 40 corresponds to "inhibiting device" described in the claims. Moreover, in the first embodiment, the range selector 37 including the selector sensor 38 corresponds to "command input device" described in the claims, the manual valve 22 corresponds to "range switching module" described in the claims, and plural electromagnetic valves 23 correspond to "switching device" described in the claims.

Second Embodiment

Figure 6:
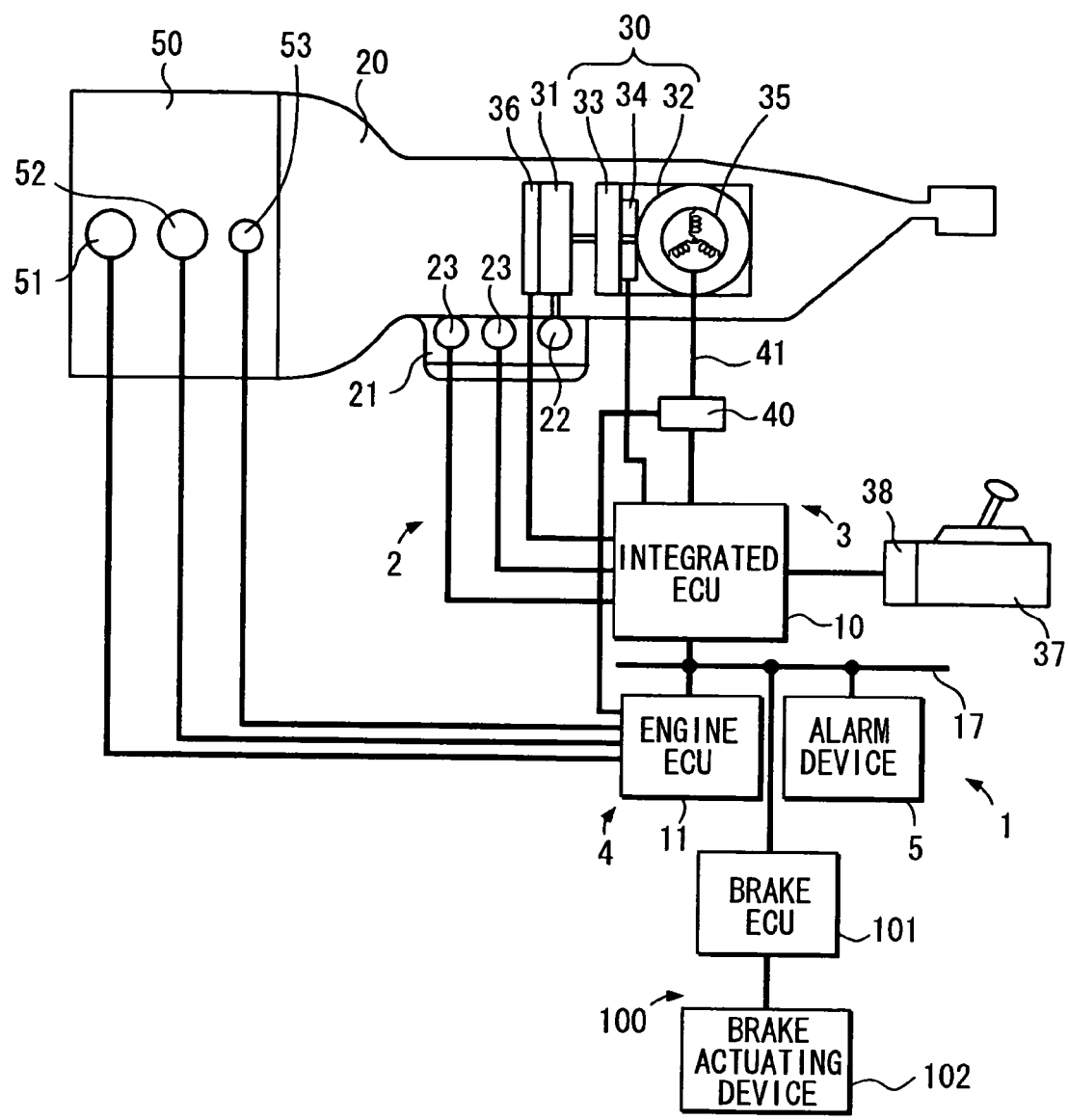
FIG. 6 is a block diagram showing a vehicle control system according to a second embodiment.

As shown in FIG. 6, a second embodiment of the present invention is a variant of the first embodiment. Components that are substantially identical to those in the first embodiment are identified by the same reference numbers, and descriptions of them are omitted.

In the second embodiment, a brake control system 100 is provided. An ECU 101 of the brake control system 100 is constructed based on a microcomputer and electrically or optically connected to a vehicle LAN line 17. A brake actuating device 102 of the brake control system 100 is mechanically or electrically connected to a brake operation member of the vehicle, and actuates vehicle brakes according to operations on a brake operation member by the vehicle passenger. The brake actuating device 102 is also electrically connected to an ECU 101, and can apply the brakes without relying on operations on the brake operation member by following electrical control of the ECU 101. In the description below, "ECU 101 of the brake control system 100" is referred to as "brake ECU 101."

Figure 7:
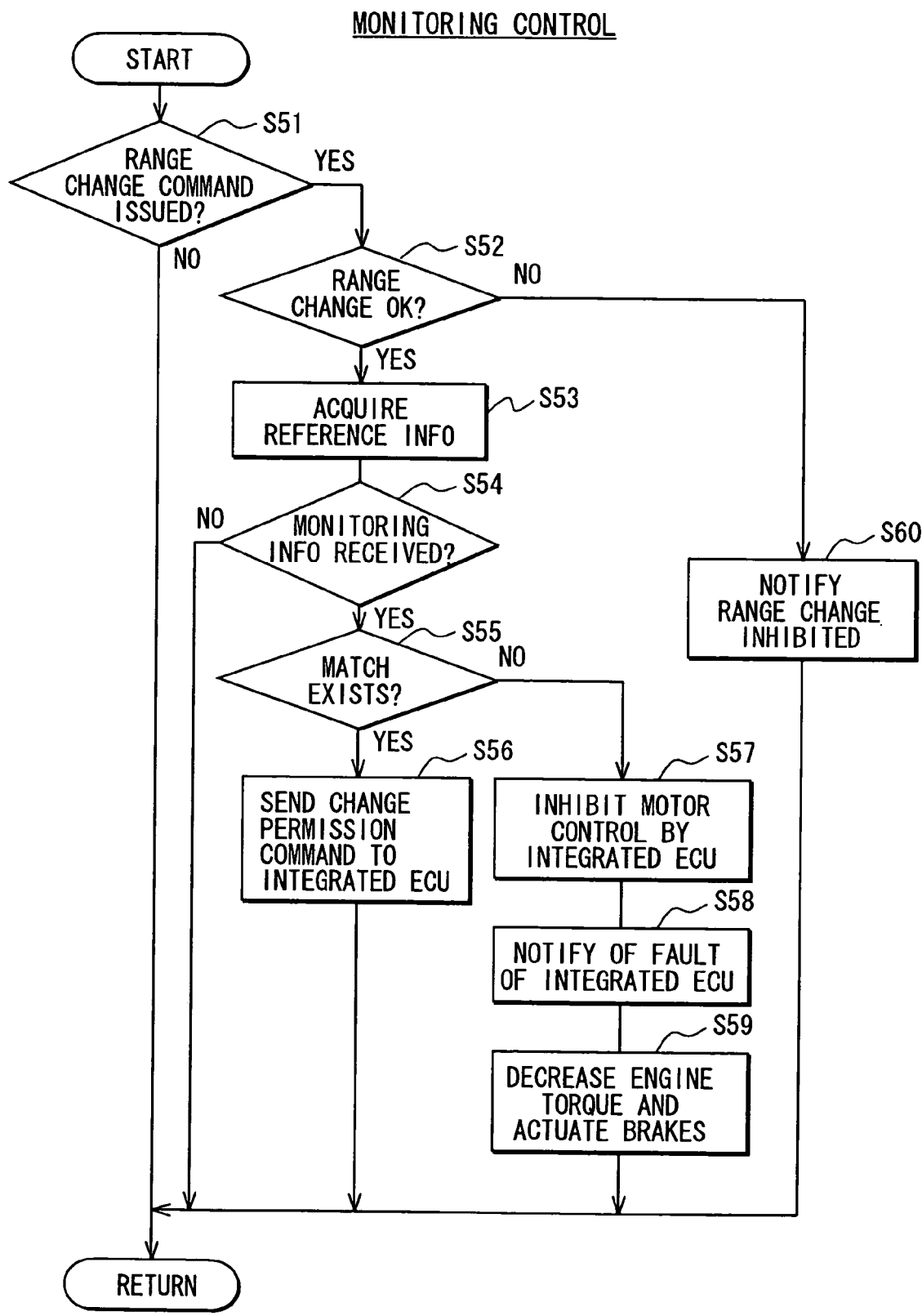
FIG. 7 is a flowchart showing a monitoring control flow according to the second embodiment.

In the second embodiment, the engine ECU 11 performs a monitoring control flow shown in FIG. 7. Specifically, the engine ECU 11 executes Steps S51 to S58 and S60, which have processing contents that respectively correspond to Steps S21 to S28 and S30 in the first embodiment (described above and shown in FIG. 5). However, Step S59 has a processing content different from Step S29 in the first embodiment. That is, in Step S59, the engine ECU 11 directly controls the engine 50 to decrease engine torque, and further commands the brake ECU 101 to actuate the brakes by the brake actuating device 102.

According to the second embodiment, upon confirming a fault of the shift-by-wire system 3, the engine ECU 11 decreases engine torque and actuates the vehicle brakes. Accordingly, when a fault occurs when the vehicle is running, the vehicle can be slowed down for safety.

In the second embodiment, the engine ECU 11 and the brake ECU 101 correspond to "a control circuit other than the by-wire control circuit" described in the claims, and the engine ECU 11 and the brake ECU 101 together construct "monitoring control device" described in the claims. In the second embodiment, the brake actuating device 102 corresponds to "actuating device," and the brake ECU 101 corresponds to "brake control circuit" in the claims.

Third Embodiment

Figure 8:
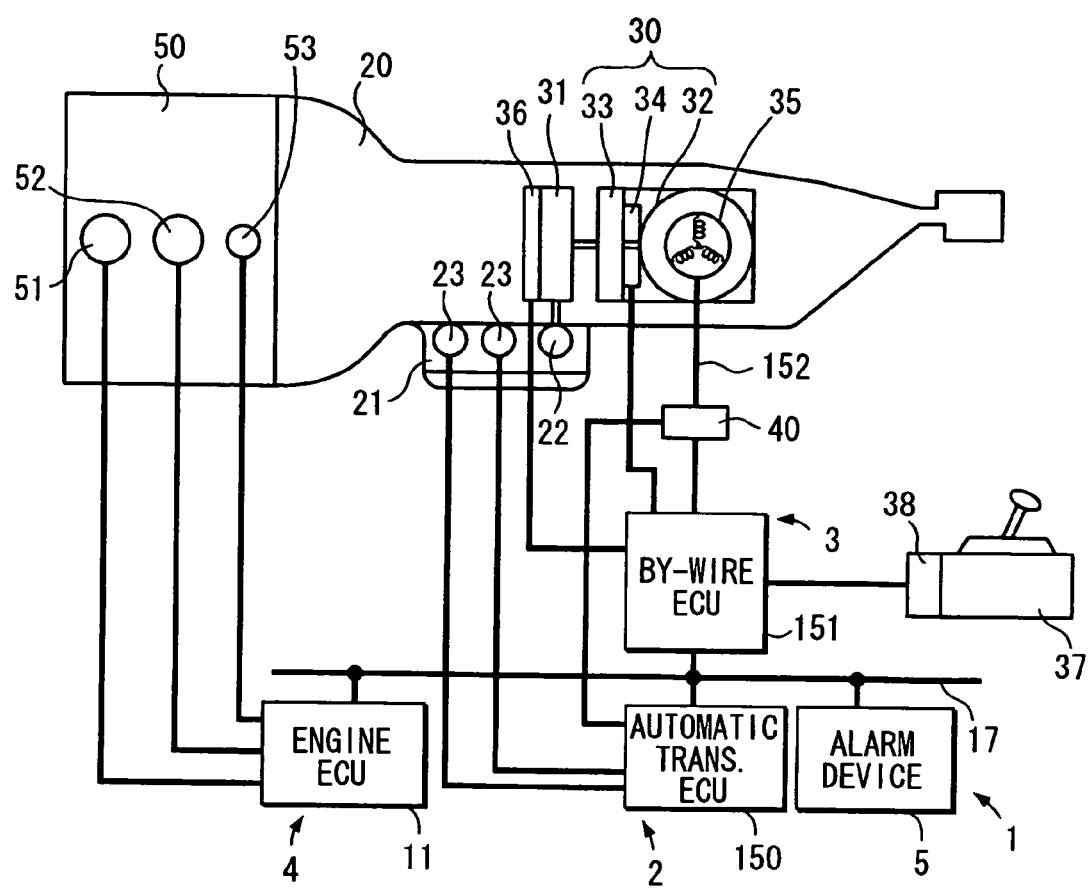
FIG. 8 is a block diagram showing a vehicle control system according to a third embodiment.

As shown in FIG. 8, a third embodiment of the present invention is a variant of the first embodiment. Components that are substantially identical to those in the first embodiment are identified by the same reference numbers, and descriptions of them are omitted.

In the third embodiment, ECUs constructed based on a microcomputer are provided in the automatic transmission control system 2 and the shift-by-wire system 3, respectively.

An ECU 150 of the automatic transmission control system 2 is electrically or optically connected to the vehicle LAN line 17, and electrically connected to electrical components such as plural electromagnetic valves 23 of the hydraulic circuit 21. Therefore, by electrically controlling each output hydraulic pressure of the plural electromagnetic valves 23, the ECU 150 engages or disengages each component of the automatic transmission 20. Particularly in this embodiment, the hydraulic circuit 21 is constructed to realize N ranges by controlling the engagement/disengagement of a given friction component via the output hydraulic pressure of a corresponding electromagnetic valve 23 without relying on the position of the manual valve 22. In descriptions below, the control of realizing N ranges by controlling the engagement/disengagement of friction components by the electromagnetic valves 23 without relying on the position of the manual valve 22 is referred to as "N range control." Also, the ECU 150 of the automatic transmission control system 2 is referred to as "automatic transmission ECU 150."

An ECU 151 of the shift-by-wire system 3 is electrically or optically connected to the vehicle LAN line 17, and at the same time electrically connected to the electric motor 32 and plural sensors 34, 36, and 38. Therefore, the ECU 151 controls the conduction to the electric motor 32, on the basis of detection signals of the sensors 34, 36, and 38. In descriptions below, "ECU 151 of the shift-by-wire system 3" is referred to as "by-wire ECU 151."

In the third embodiment, the switch device 40 is provided on a conduction passage 152 between the by-wire ECU 151 and the driving part 35 of the electric motor 32, and the automatic transmission ECU 150 is electrically connected to the switch device 40. Accordingly, the automatic transmission ECU 150 receives monitoring information for monitoring the shift-by-wire system 3 from the by-wire ECU 151 via the vehicle LAN line 17 and electrically controls the switch device 40 on the basis of the monitoring information. Therefore, the automatic transmission ECU 150 can permit or inhibit the control of conduction to the electric motor 32 via the by-wire ECU 151 by giving an on-control command or an off-control command to the switch device 40.

Figure 9:
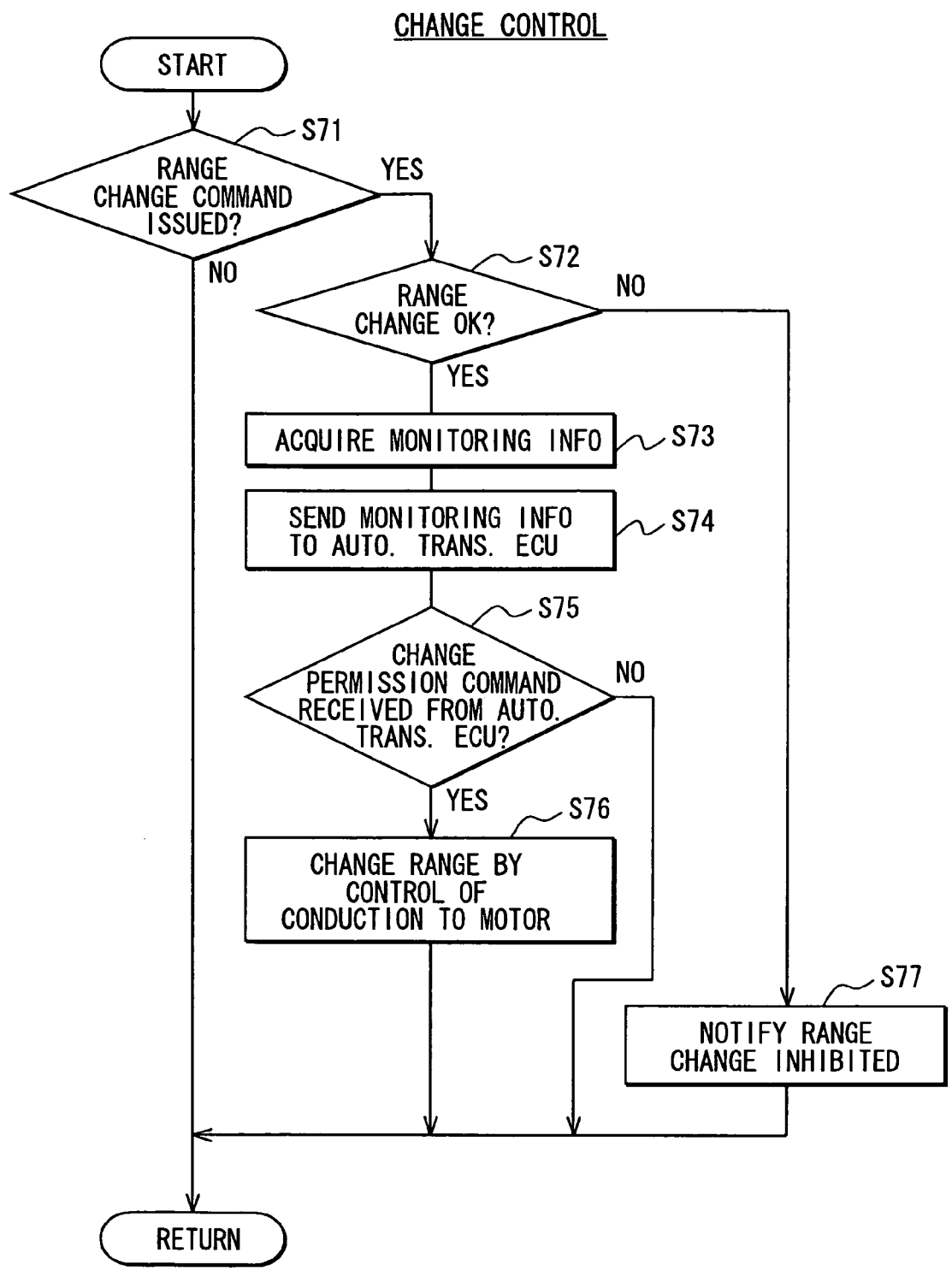
FIG. 9 is a flowchart showing a change control flow according to the third embodiment.

In the third embodiment described above, the by-wire ECU 151 performs a change control flow shown in FIG. 9. Specifically, the by-wire ECU 151 executes Steps S71 to S77 having processing contents similar to Step S11 to S17 of the first embodiment, except that the engine ECU 11 is replaced by the automatic transmission ECU 150.

Figure 10:
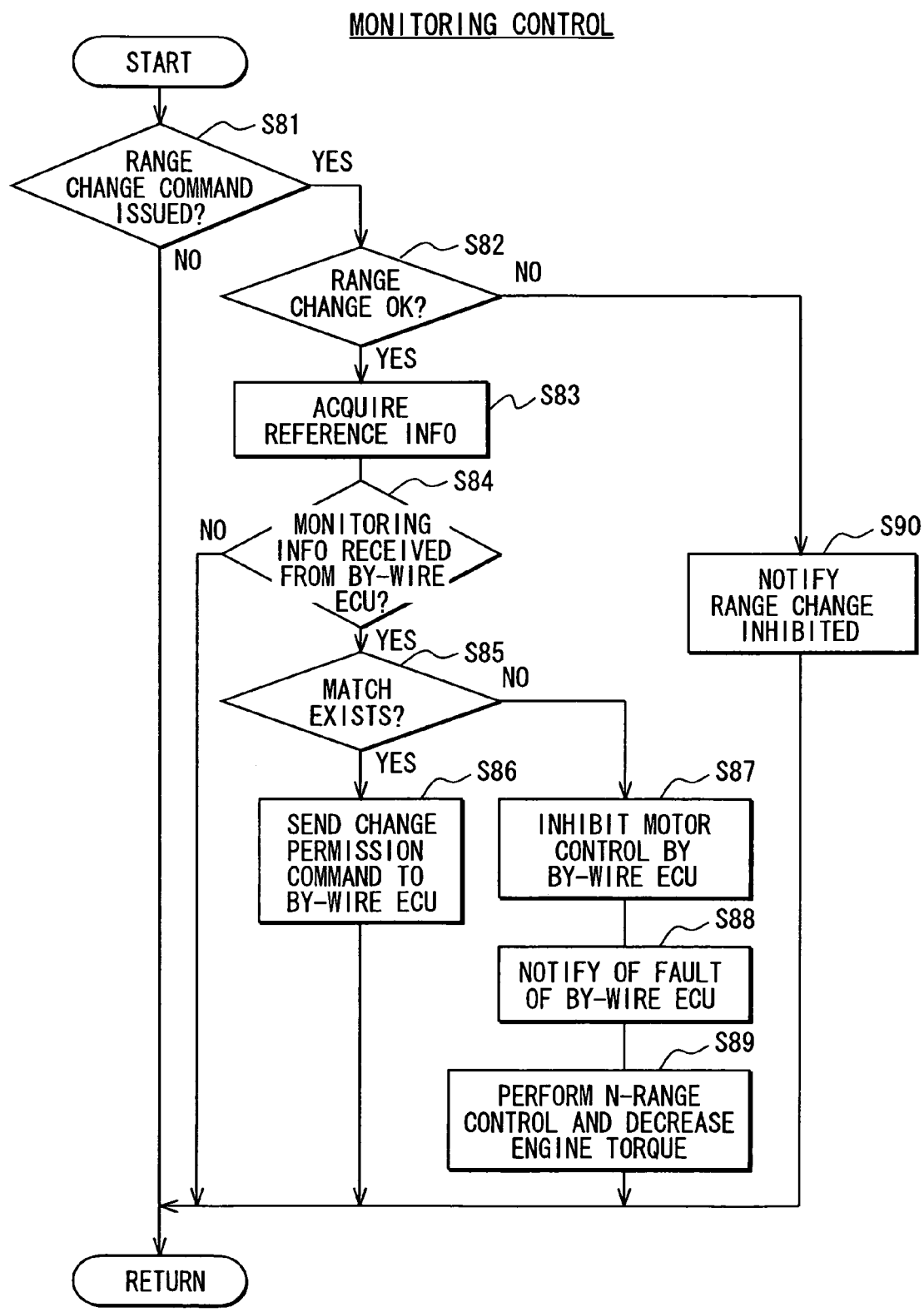
FIG. 10 is a flowchart showing a monitoring control flow according to the third embodiment.

In the third embodiment, the automatic transmission ECU 150 performs a monitoring control flow shown in FIG. 10. Specifically, the automatic transmission ECU 150 executes Steps S81 to S88, and S90 having processing contents that respectively correspond to Steps S21 to S28, and S30 of the first embodiment, except that the integrated ECU 10 is replaced by the by-wire ECU 151, and further executes Step S89 having processing contents different from S29 of the first embodiment. That is, in Step S89, the automatic transmission ECU 150 performs N range control by directly controlling the electromagnetic valves 23 subject to N range control. At the same time, the automatic transmission ECU 150 commands the engine ECU 11 connected via the vehicle LAN line 17 to decrease engine torque by the throttle device 51 and the fuel injection valve 52.

According to the third embodiment, on confirming a fault of the shift-by-wire system 3, the automatic transmission ECU 150 not only decreases engine torque but also sets the range of the automatic transmission 20 to N range, which is a non-running range. Accordingly, when a fault occurs while the vehicle is running, the vehicle can be stopped without causing range change that conflicts with the intention of the vehicle passenger. As such, the safety of the vehicle can be ensured.

In the third embodiment, the by-wire ECU 151 corresponds to a by-wire control circuit described in the claims, and the automatic transmission ECU 150 corresponds to an automatic transmission control circuit described in the claims. Furthermore, in the third embodiment, the automatic transmission ECU 150 and the engine ECU 11 correspond to "control circuits other than the by-wire control circuit" described in the claims, and the ECUs 150 and 11 together construct "monitoring control device" described in the claims.

Fourth Embodiment

Figure 11:
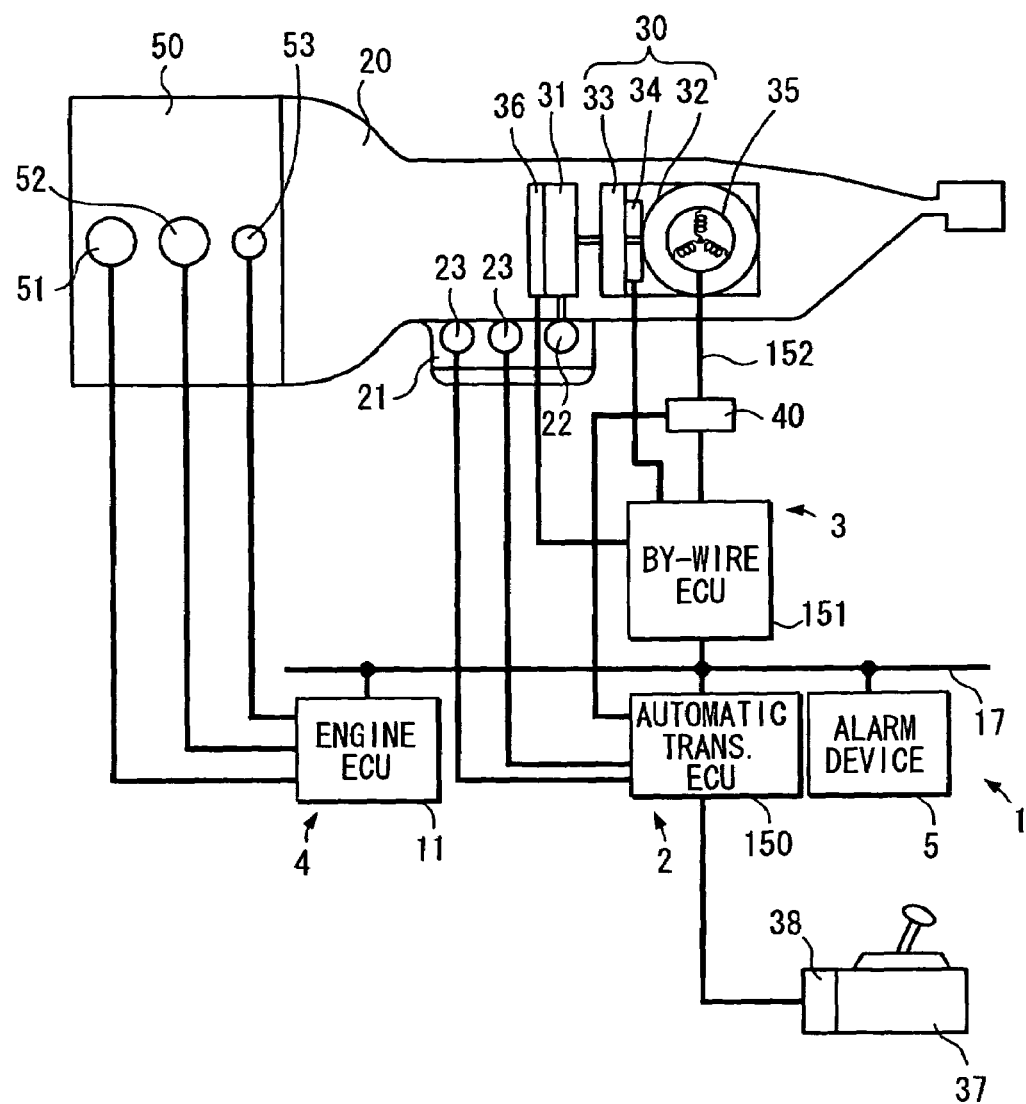
FIG. 11 is a block diagram showing a vehicle control system according to a fourth embodiment.

As shown in FIG. 11, a fourth embodiment of the present invention is a variant of the third embodiment. Components that are substantially identical to those in the third embodiment are identified by the same reference numbers, and descriptions of them are omitted.

In the fourth embodiment, in place of the by-wire ECU 151, the automatic transmission ECU 150 is electrically connected to the selector sensor 38. That is, in the fourth embodiment in which the ECUs 150 and 151 are mutually connected via the vehicle LAN line 17, it can be considered that the ECUs 150 and 151 are connected in series to the selector sensor 38 in that order.

In the fourth embodiment described above, in Steps S71, S73, and S76 of the change control flow, the by-wire ECU 151 uses a detection signal received from the selector sensor 38 via the automatic transmission ECU 150. On the other hand, in Steps S81 and S83 of the monitoring control flow, the automatic transmission ECU 150 uses a detection signal directly received from the selector sensor 38. Therefore, according to the fourth embodiment, the safety of the vehicle can be ensured by the same principle as the first embodiment.

Fifth Embodiment

Figure 12:
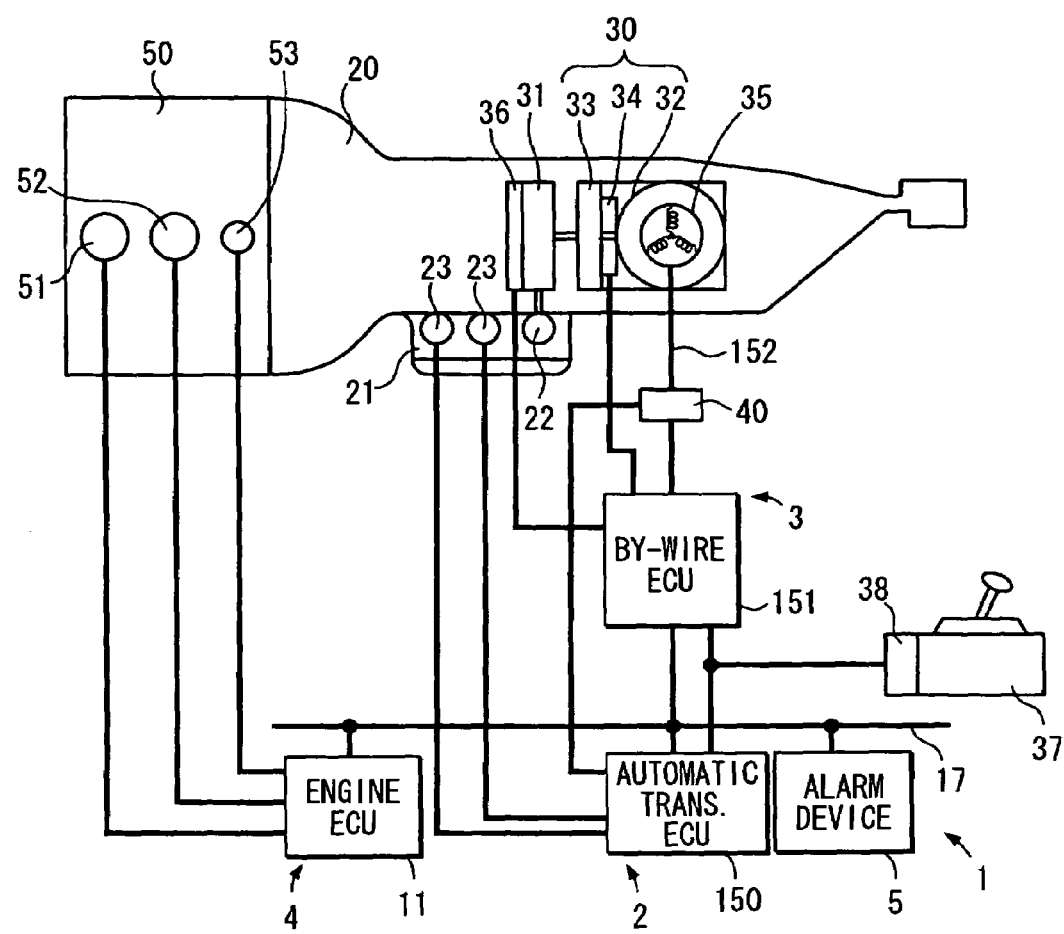
FIG. 12 is a block diagram showing a vehicle control system according to a fifth embodiment.

As shown in FIG. 12, a fifth embodiment of the present invention is a variant of the third embodiment. Components that are substantially identical to those in the third embodiment are identified by the same reference numbers, and descriptions of them are omitted.

In the fifth embodiment, the selector channel 38 is electrically connected to both the automatic transmission ECU 150 and the by-wire ECU 151. That is, in the fifth embodiment, it can be considered that the ECUs 150 and 151 are connected in parallel to the selector sensor 38.

In the fifth embodiment described above, in Steps S71, S73, and S76 of the change control flow, the by-wire ECU 151 uses a detection signal received directly from the selector sensor 38. Likewise, in Steps S81 and S83 of the monitoring control flow, the automatic transmission ECU 150 uses a detection signal directly received from the selector sensor 38.

According to the fifth embodiment, the safety of the vehicle can be ensured by the same principle as the first embodiment. Furthermore, according to the fifth embodiment, since both the ECUs 150 and 151 receive a detection signal directly from the selector sensor 38, a target range can be correctly and quickly acquired in the ECUs 150 and 151. Accordingly, when a fault occurs in the shift-by-wire system 3, since a fault can be quickly detected and conduction to the electric motor 32 can be inhibited, the electric motor 32 can be stopped without fail before the actuator 30 realizes a range against an intention of the vehicle passenger. Since a target range is quickly acquired, the automatic transmission ECU 150 can detect a fault in less time, so that a response to a range change command can be improved, giving a good range change feeling to the vehicle passenger. Yet, the by-wire ECU 151 that receives a detection signal directly from the selector sensor 38 can realize range change by controlling the actuator 30 without relying on the ECU 11, when the automatic transmission ECU 150 fails.

Sixth Embodiment

Figure 13:
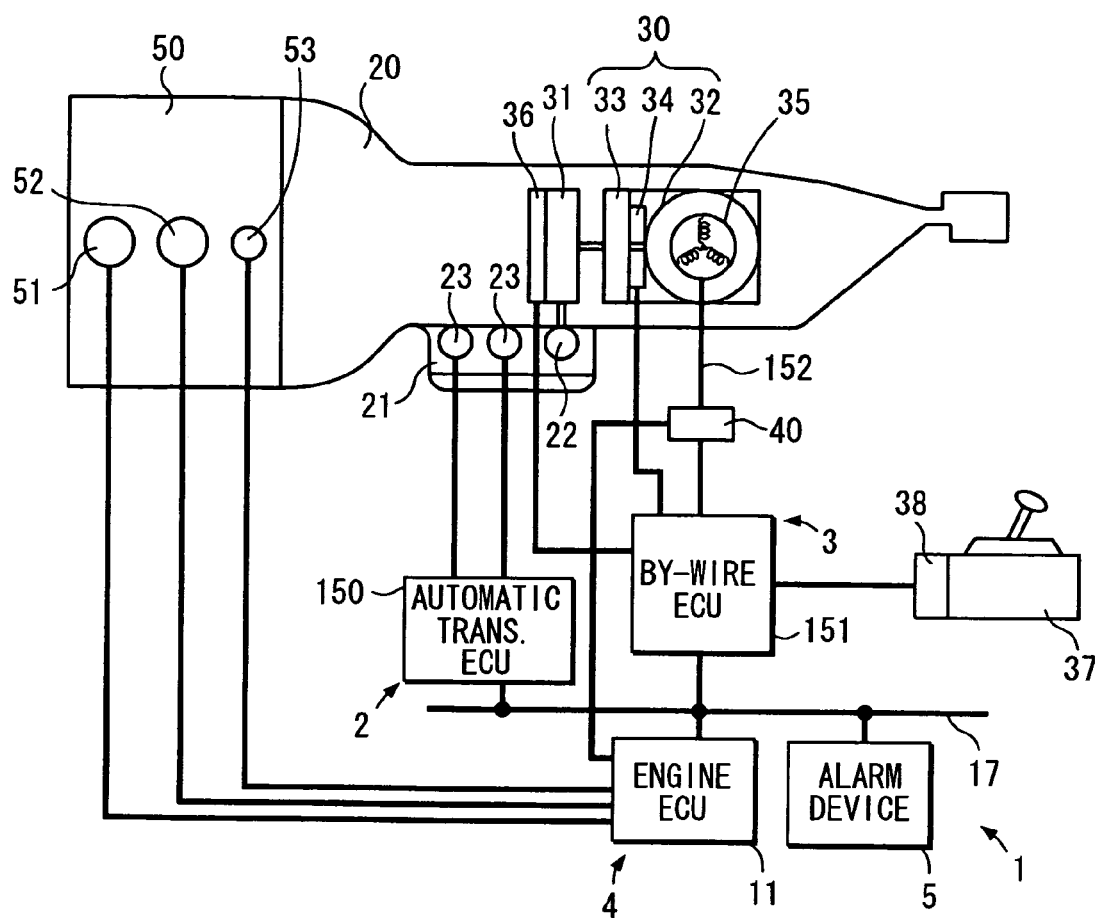
FIG. 13 is a block diagram showing a vehicle control system according to a sixth embodiment.

As shown in FIG. 13, a sixth embodiment of the present invention is a variant of the third embodiment. Components that are substantially identical to those in the first embodiment are identified by the same reference numbers, and descriptions of them are omitted.

In the sixth embodiment, in place of the automatic transmission ECU 150, the engine ECU 11 is electrically connected to the switch device 40. Accordingly, the engine ECU 11 electrically controls the switch device 40 on the basis of monitoring information received via the vehicle LAN line 17 from the by-wire ECU 151. Therefore, the engine ECU 11 can permit or inhibit the control of conduction to the electric motor 32 by the by-wire ECU 151 by giving an on-control command or an off-control command to the switch device 40.

In the sixth embodiment described above, the by-wire ECU 151 performs a change control flow (see FIG. 4) having processing contents similar to that in the first embodiment.

Figure 14:
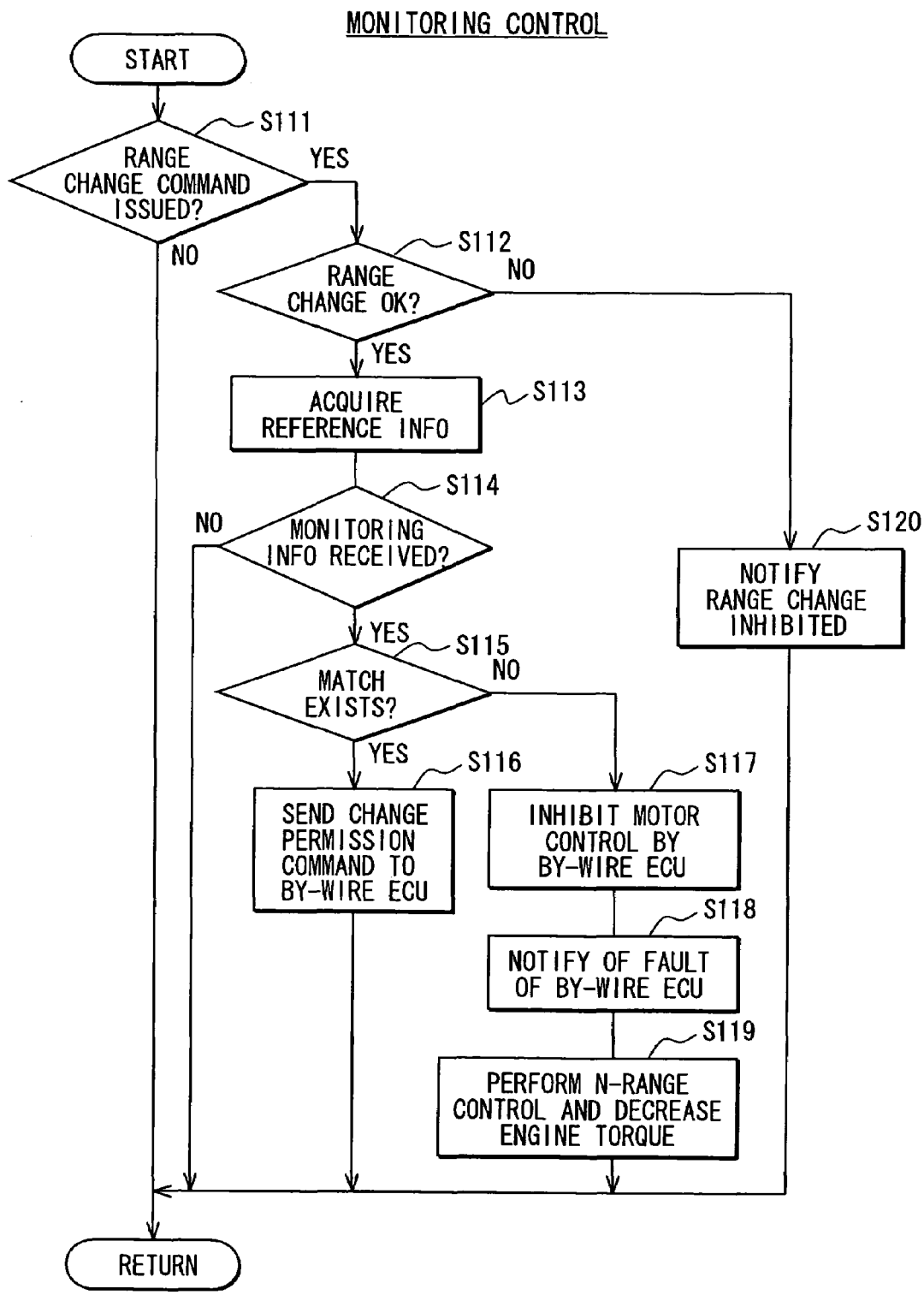
FIG. 14 is a flowchart showing a monitoring control flow according to the sixth embodiment.

In the sixth embodiment, the engine ECU 11 performs a monitoring control flow shown in FIG. 14. Specifically, the engine ECU 11 executes Steps S111 to S118, and S120 having processing contents similar to Steps S81 to S88, and S90 of the third embodiment, and further executes Step S119 having processing contents different from Step S89 of the third embodiment. That is, in Step S119, the engine ECU 11 commands the automatic transmission ECU 150 connected via the vehicle LAN line 17 to perform N range control by the electromagnetic valves 23. At the same time, the engine ECU 11 decreases engine torque by directly controlling the engine 50.

Thus, in the sixth embodiment, on confirming a fault of the shift-by-wire system 3, the engine ECU 11 inhibits the conduction to the electric motor 32, decreases engine torque, and performs N range control. Therefore, when a fault occurs when the vehicle is running, the vehicle can be stopped without causing range change contrary to the intention of the vehicle passenger, and the safety of the vehicle can be ensured.

Seventh Embodiment

Figure 15:
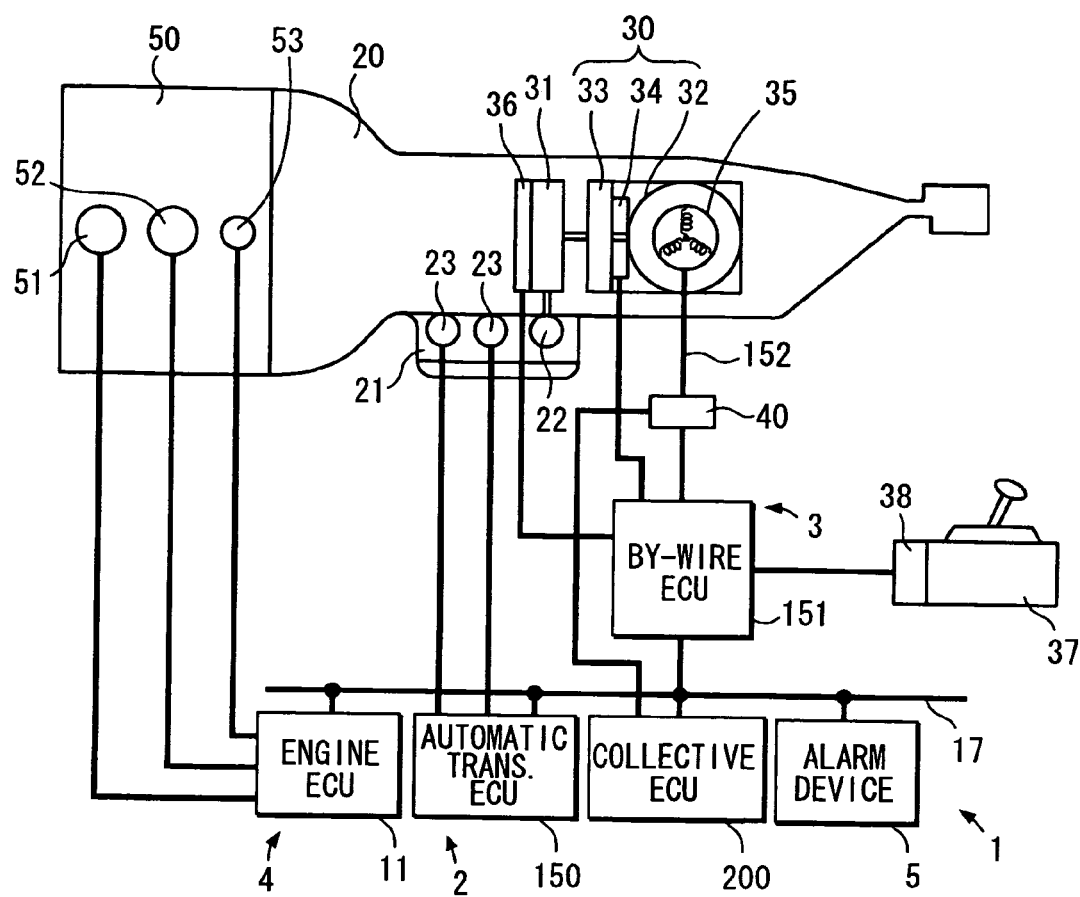
FIG. 15 is a block diagram showing a vehicle control system according to a seventh embodiment.

As shown in FIG. 15, a seventh embodiment of the present invention is a variant of the third embodiment. Components that are substantially identical to those in the third embodiment are identified by the same reference numbers, and descriptions of them are omitted.

In the seventh embodiment, a collective ECU 200 that is constructed based on a microcomputer and collectively controls the vehicle is electrically or optically connected to the vehicle LAN line 17.

Furthermore, in the seventh embodiment, in place of the engine ECU 11, the collective ECU 200 is electrically connected to the switch device 40. Accordingly, the collective ECU 200 electrically controls the switch device 40 on the basis of monitoring information received via the vehicle LAN line 17 from the by-wire ECU 151. Therefore, the collective ECU 200 can permit or inhibit the control of conduction to the electric motor 32 via the by-wire ECU 151 by giving an on-control command or an off-control command to the switch device 40.

Figure 16:
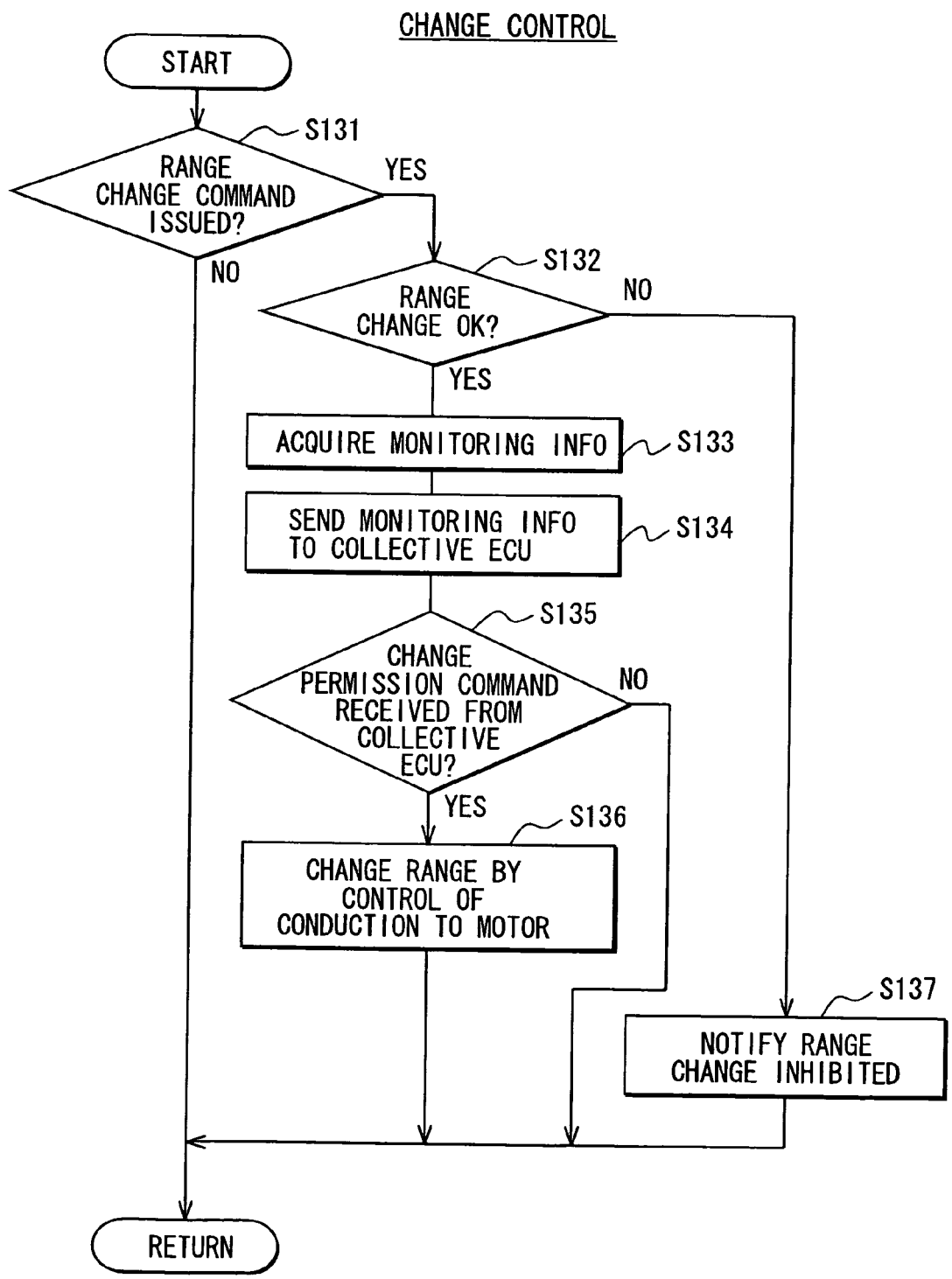
FIG. 16 is a flowchart showing a change control flow according to the seventh embodiment.

In the seventh embodiment described above, the by-wire ECU 151 performs a change control flow shown in FIG. 16. Specifically, the by-wire ECU 151 executes Steps S131 to S137 having processing contents that correspond respectively to Steps S71 to S77 of the third embodiment, except that the automatic transmission ECU 150 is replaced by the collective ECU 200.

Figure 17:
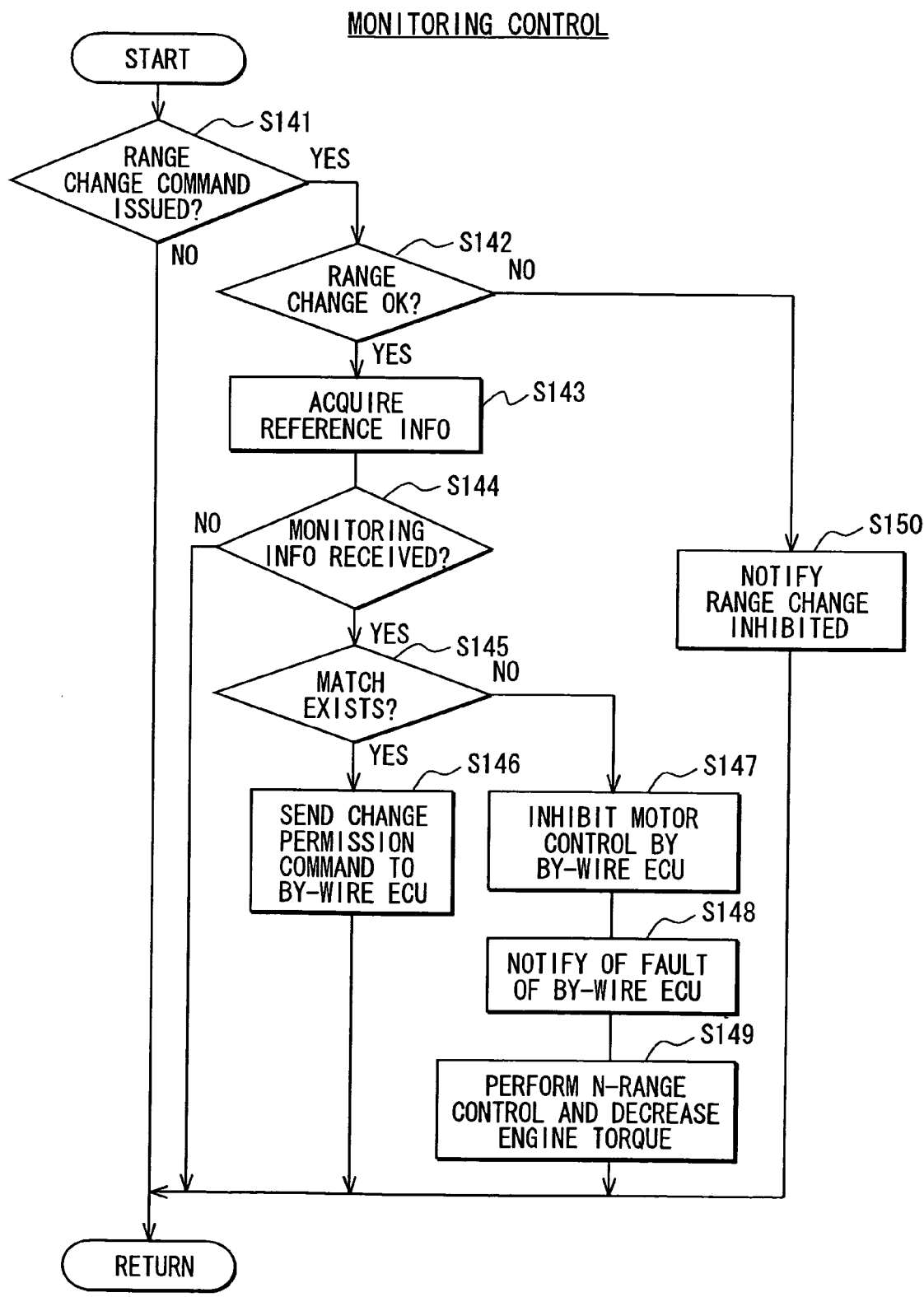
FIG. 17 is a flowchart showing a monitoring control flow according to the seventh embodiment.

In the seventh embodiment, the collective ECU 200 performs a monitoring control flow shown in FIG. 17. Specifically, the collective ECU 200 executes Steps S141 to S148, and S150 having processing contents that correspond respectively to Steps S81 to S88, and S90 of the third embodiment, and further executes Step S149 having processing contents different from Step S89 of the third embodiment. That is, in Step S149, the collective ECU 200 commands the automatic transmission ECU 150 connected via the vehicle LAN line 17 to perform N range control by the electromagnetic valves 23. At the same time, the collective ECU 200 commands the engine ECU 11 connected via the vehicle LAN line 17 to decrease engine torque by the throttle device 51 and the fuel injection valve 52.

Thus, in the seventh embodiment, on confirming a fault of the shift-by-wire system 3, the collective ECU 200 inhibits the conduction to the electric motor 32, decreases engine torque, and performs N range control. Therefore, when a fault occurs when the vehicle is running, the vehicle can be stopped without causing range change that conflicts with the intention of the vehicle passenger, and the safety of the vehicle can be ensured.

In the third embodiment, the automatic transmission ECU 150, the collective ECU 200, and the engine ECU 11 correspond to "control circuits other than the by-wire control circuit" described in the claims, and the ECUs 150, 200, and 11 together construct "monitoring control device" described in the claims.

Eighth Embodiment

Figure 18:
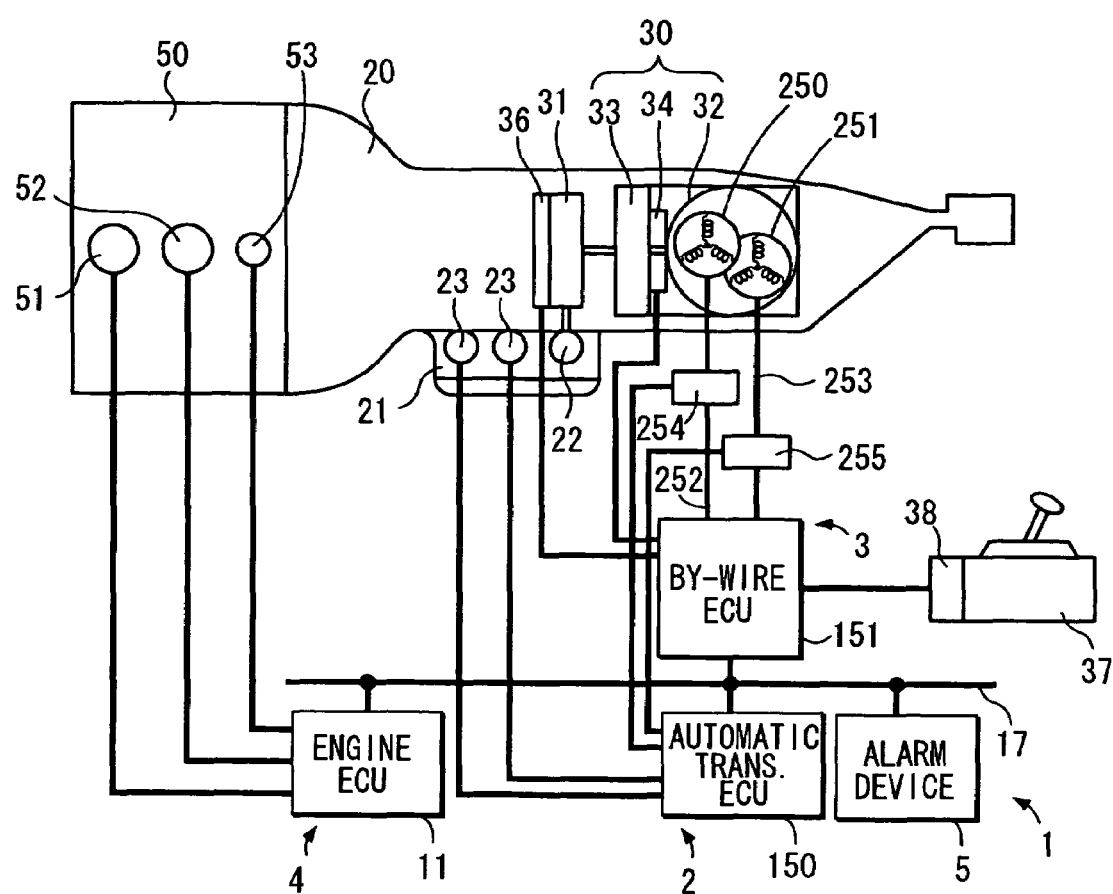
FIG. 18 is a block diagram showing a vehicle control system according to an eighth embodiment.

As shown in FIG. 18, an eighth embodiment of the present invention is a variant of the third embodiment. Components that are substantially identical to those in the third embodiment are identified by the same reference numbers, and descriptions of them are omitted.

In the eighth embodiment, two driving parts that individually generate driving force are provided in the electric motor 32 to form a duplexed system by which the reliability of the actuator 30 is increased. The two driving parts 250, 251 of the electric motor 32 are electrically connected to the by-wire ECU 151 by individual conduction passages 252, 253, respectively. Two switch devices 254, 255 are provided on the conduction passages 252, 253, and the two switch devices 254, 255 are electrically connected to the automatic transmission ECU 150. With this construction, the automatic transmission ECU 150 electrically controls the switch devices 254 and 255 on the basis of monitoring information received via the vehicle LAN line 17 from the by-wire ECU 151. Therefore, the automatic transmission ECU 150 can permit or inhibit the control of conduction to the first driving part 250 by the by-wire ECU 151 by giving an on-control command or an off-control command to the first switch device 254. Likewise, the engine ECU 11 can permit or inhibit the control of conduction to the second driving part 251 by the by-wire ECU 151 by giving an on-control command or an off-control command to the second switch device 255.

Figure 19:
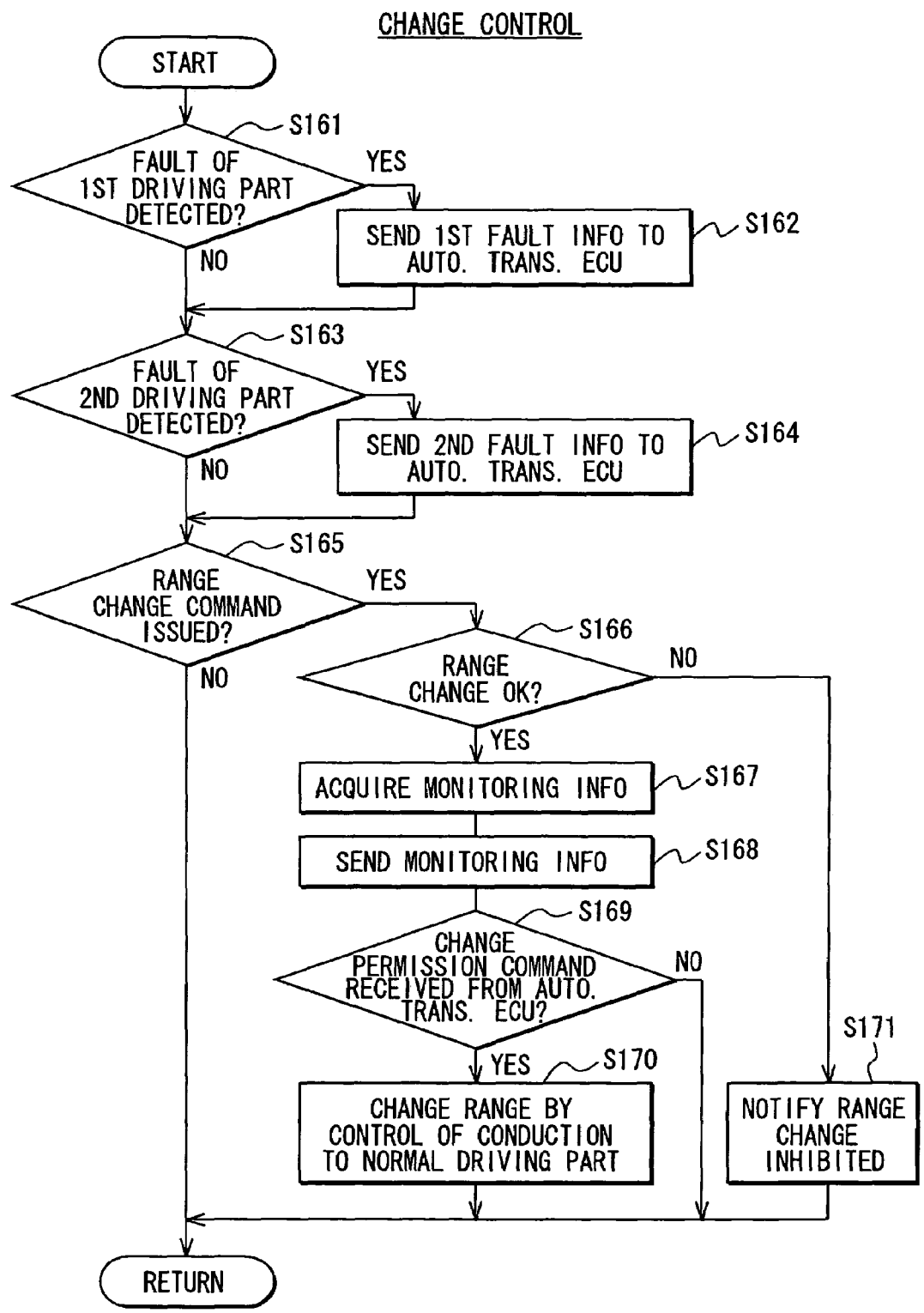
FIG. 19 is a flowchart showing a change control flow according to the eighth embodiment.

In the eighth embodiment described above, the by-wire ECU 151 performs a change control flow shown in FIG. 19. Specifically, in Step S161, the by-wire ECU 151 determines whether a fault of the first driving part 250 is detected. At this time, the by-wire ECU 151 gives a command for turning on the first switch device 254 to the automatic transmission ECU 150 to determine a fault of the first driving part 250 on the basis of the conditions of conduction to the first driving part 250. As a result, when affirmative determination has been made, in Step S162, the by-wire ECU 151 sends first fault information indicating a fault of the first driving part 250 to the automatic transmission ECU 150 as one piece of monitoring information. On the other hand, when negative determination has been made in S161, or after execution of Step S162, the ECU 151 determines, in Step S163, whether a fault of the second driving part 251 has been detected. At this time, the by-wire ECU 151 gives a command for turning on the second switch device 255 to the automatic transmission ECU 150 to determine a fault of the first driving part 250 on the basis of the conditions of conduction to second driving part 251.

When affirmative determination has been made in Step S163, in Step S164, the by-wire ECU 151 sends second fault information indicating a fault of the second driving part 251 to the automatic transmission ECU 150 as one piece of monitoring information. On the other hand, when negative determination has been made in S163, or after execution of Step S164, the ECU 151 executes Step S165.

Steps 165 to S169 and S171 have processing contents respectively corresponding to Steps S71 to S75, and S77 of the third embodiment, but Step S170 has processing contents different from Step S76 of the third embodiment. That is, in Step S170, the by-wire ECU 151 performs feedback control for conduction to any of the driving parts 250 and 251 that has been determined to be normal in Steps S161 and S163, and thereby realizes range change.

Figure 20:
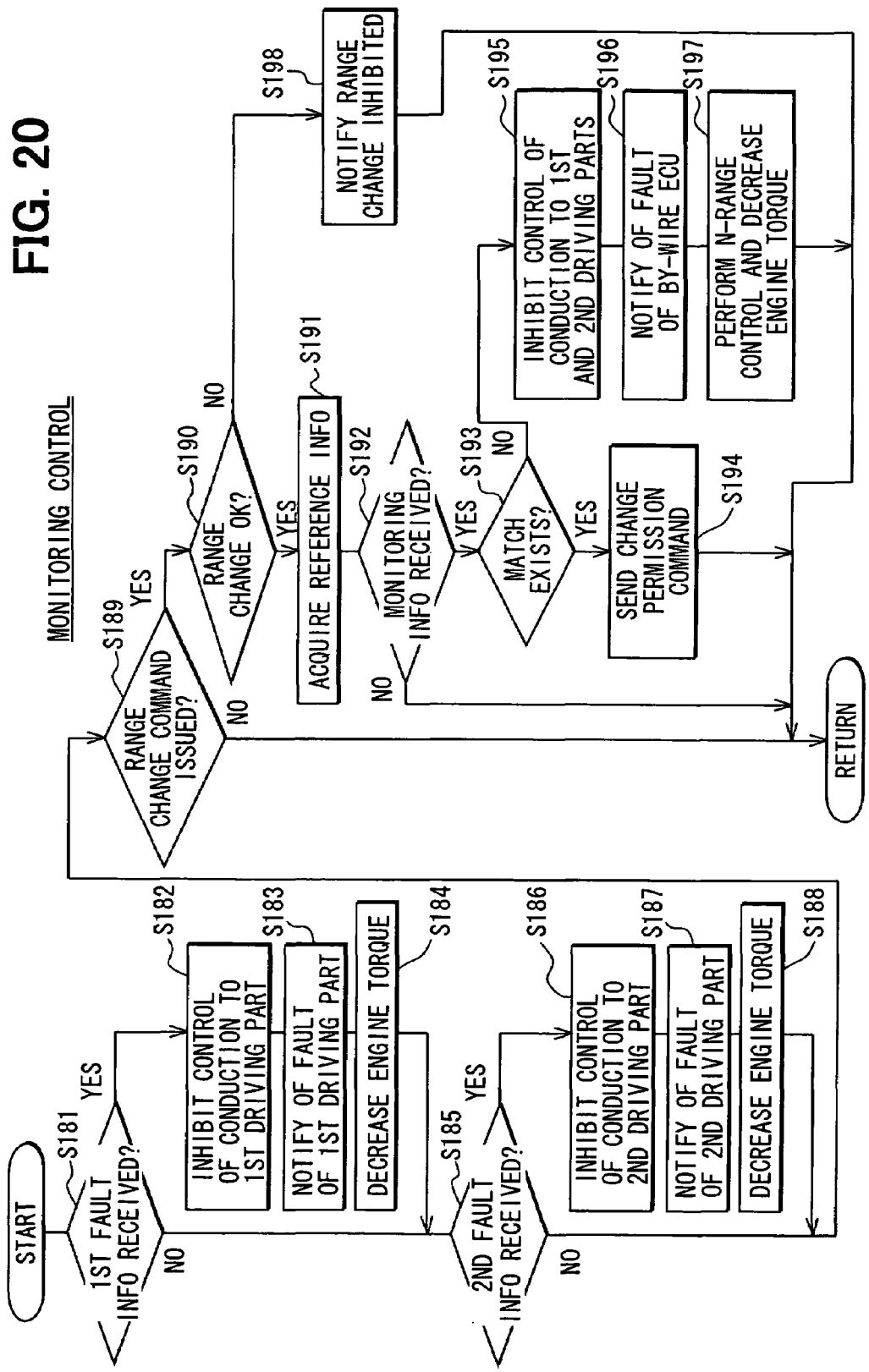
FIG. 20 is a flowchart showing a monitoring control flow according to the eighth embodiment.

In the eighth embodiment, in addition to the execution of the change control flow, the automatic transmission ECU 150 performs a monitoring control flow shown in FIG. 20. Specifically, the automatic transmission ECU 150 determines in Step S181 whether the first fault information has been received from the by-wire ECU 151. As a result, when affirmative determination has been made, the automatic transmission ECU 150 inhibits the control of conduction to the first driving part 250 by the by-wire ECU 151 by giving an off-control command to the first switch device 254. In subsequent Step S183, the automatic transmission ECU 150 controls the alarm device 5 to notify the vehicle passenger of a fault of the first driving part 250. In subsequent Step S184, the automatic transmission ECU 150 commands the engine ECU 11 to decrease engine torque by the throttle device 51 and the fuel injection valve 52.

When negative determination has been made in S181, or after execution of Step S184, the automatic transmission ECU 150 determines in Step 185 whether the second fault information has been received from the by-wire ECU 151. As a result, when affirmative determination has been made, in Step S186, the automatic transmission ECU 150 inhibits the control of conduction to the second driving part 251 by the by-wire ECU 151 by giving an off-control command to the second switch device 255. In subsequent Step S187, the automatic transmission ECU 150 controls the alarm device 5 to notify the vehicle passenger of a fault of the second driving part 251. In subsequent Step S188, the automatic transmission ECU 150 commands the engine ECU 11 to decrease engine torque by the throttle device 51 and the fuel injection valve 52.

When negative determination has been made in S185, or after execution of Step S188, the automatic transmission ECU 150 executes Step S189. Steps 189 to S194 and S196 to S198 have processing contents corresponding respectively to Steps S81 to S86 and S88 to S90 of the third embodiment. However, Step S195 has processing contents different from Step S87 of the third embodiment. That is, in Step S195, the automatic transmission ECU 150 inhibits the control of conduction to the driving parts 250 and 251 by the by-wire ECU 151 by giving off-control commands to both the switch devices 254 and 255.

According to the eighth embodiment, the by-wire ECU 151 controls the two driving parts 250, 251 of the electric motor 32 through the individual conduction passages 252, 253. Thus, even when one of the driving parts fails, since the other driving part can generate rotational driving force to drive the manual valve 22, the safety of the vehicle can be ensured as in the third embodiment.

Furthermore, according to the eighth embodiment, the automatic transmission ECU 150 can correctly determine a faulty driving part of the driving parts 260, 261 on the basis of fault information received from the by-wire ECU 151. Yet, according to the eighth embodiment, the automatic transmission ECU 150 can selectively inhibit only the control of conduction to a faulty driving part by the by-wire ECU 151 by electrically controlling a switch device of the switch devices 254, 255 that corresponds to a faulty driving part. Therefore, a situation can be prevented without fail in which the vehicle passenger brings about a range change against his (her) intention as a result of the faulty driving part performing operations different from a control command.

In the eighth embodiment described above, the first and second switch devices 254 and 255 construct the "inhibiting device" described in the claims, and the first and second switch devices 254 and 255 correspond to "inhibiting parts" described in the claims, respectively.

Ninth Embodiment

Figure 21:
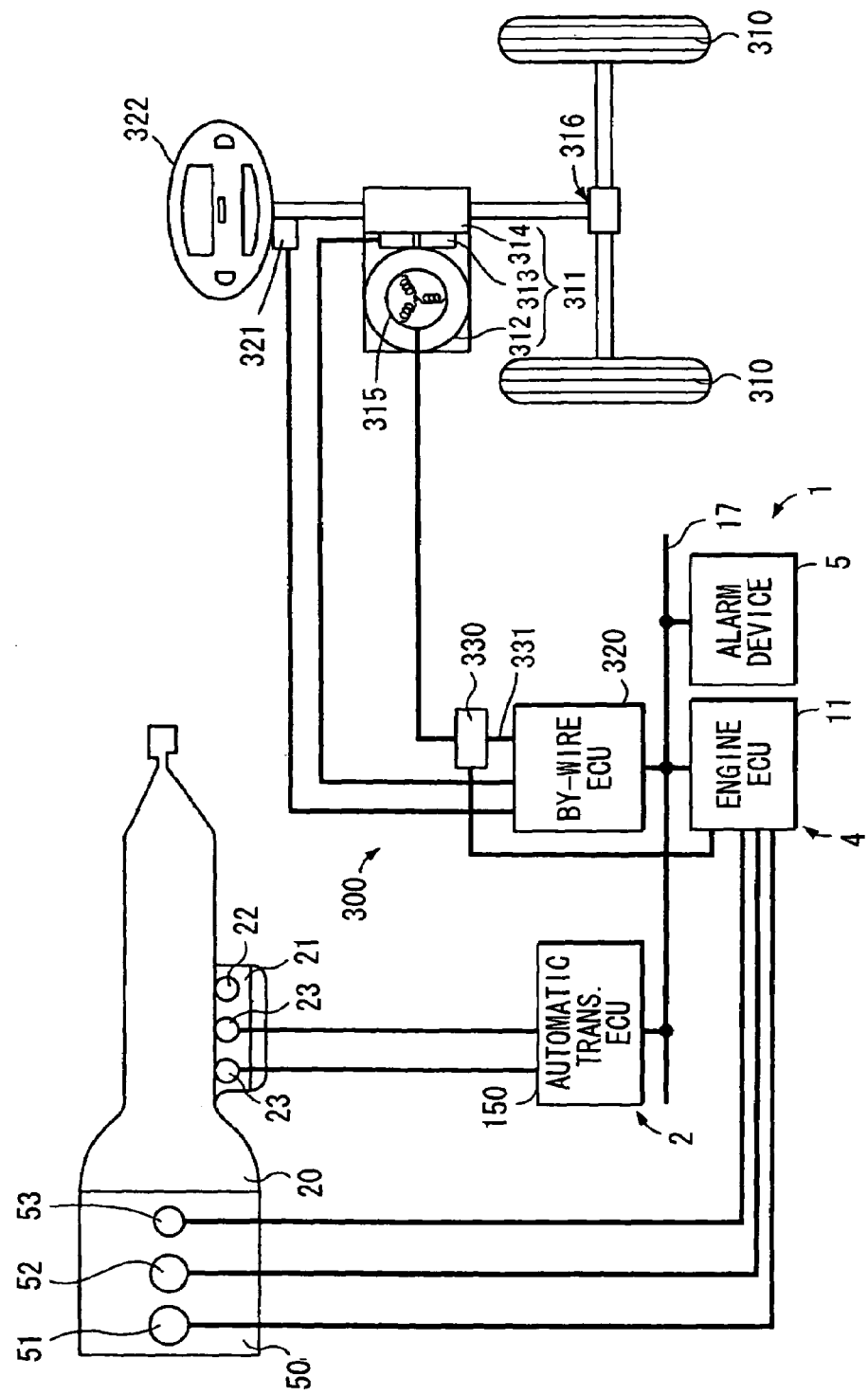
FIG. 21 is a block diagram showing a vehicle control system according to a ninth embodiment.

As shown in FIG. 21, a ninth embodiment of the present invention is a variant of the sixth embodiment. Components that are substantially identical to those in the sixth embodiment are identified by the same reference numbers, and descriptions of them are omitted.

In the ninth embodiment, a steer-by-wire system 300 is provided in the vehicle control system 1. The steer-by-wire system 300 includes an actuator 311 that drives a steering shaft 310 of the vehicle in a steering direction. The actuator 311, which is electromagnetically driven, includes an electric motor 312, a rotational angle sensor 313, an output module 314, and the like. The electric motor 312 includes a driving part 315 formed by connecting plural coils disposed in a rotational direction, and produces a rotational driving force according to conduction to the driving part 315. The actuator 311 transmits the rotational driving force produced by the electric motor 312 to steering wheels 310 via a steering output system 316 of the vehicle. Therefore, a steering angle of the steering wheels 310 changes according to a rotational angle of the electric motor 312.

The steer-by-wire system 300 further includes an ECU 320 constructed mainly by a microcomputer. The ECU 320 is electrically or optically connected to the vehicle LAN line 17. The ECU 320 is electrically connected to the driving part 315 and the rotational angle sensor 313 of the electric motor 312, and a handle angle sensor 321 of the vehicle. The rotational angle sensor 313 detects a rotational angle of an output shaft of the electric motor 312, and outputs the detection signal to the ECU 320. As described above, since a steering angle of the steering wheels 310 changes according to a rotational angle of the electric motor 312, a rotational angle detected by the rotational angle sensor 313 indirectly indicates an actual steering angle realized in the vehicle. The handle angle sensor 321 detects a handle angle inputted by the vehicle passenger operating a steering handle 322 of the vehicle, and outputs the detection signal to the ECU 320. Thus, the ECU 320 that receives detection signals from the sensors 313 and 321 controls conduction to the electric motor 312 on the basis of the detection signals. In descriptions below, "the ECU 320 of the steer-by-wire system 300" is referred to as "by-wire ECU 320."

The steer-by-wire system 300 further includes a switch device 330. The switch device 330 is provided on a conduction passage 331 between the by-wire ECU 320 and the driving part 315 of the electric motor 312, and at the same time electrically connected to the engine ECU 11. The engine ECU 11 of this embodiment receives monitoring information for monitoring the steer-by-wire system 300 via the vehicle LAN line 17 from the by-wire ECU 320, and electrically controls the switch device 330. Therefore, the engine ECU 11 can permit or inhibit the control of conduction to the driving part 315 by the by-wire ECU 320 by giving an on-control command or an off-control command to the switch device 330.

Figure 22:
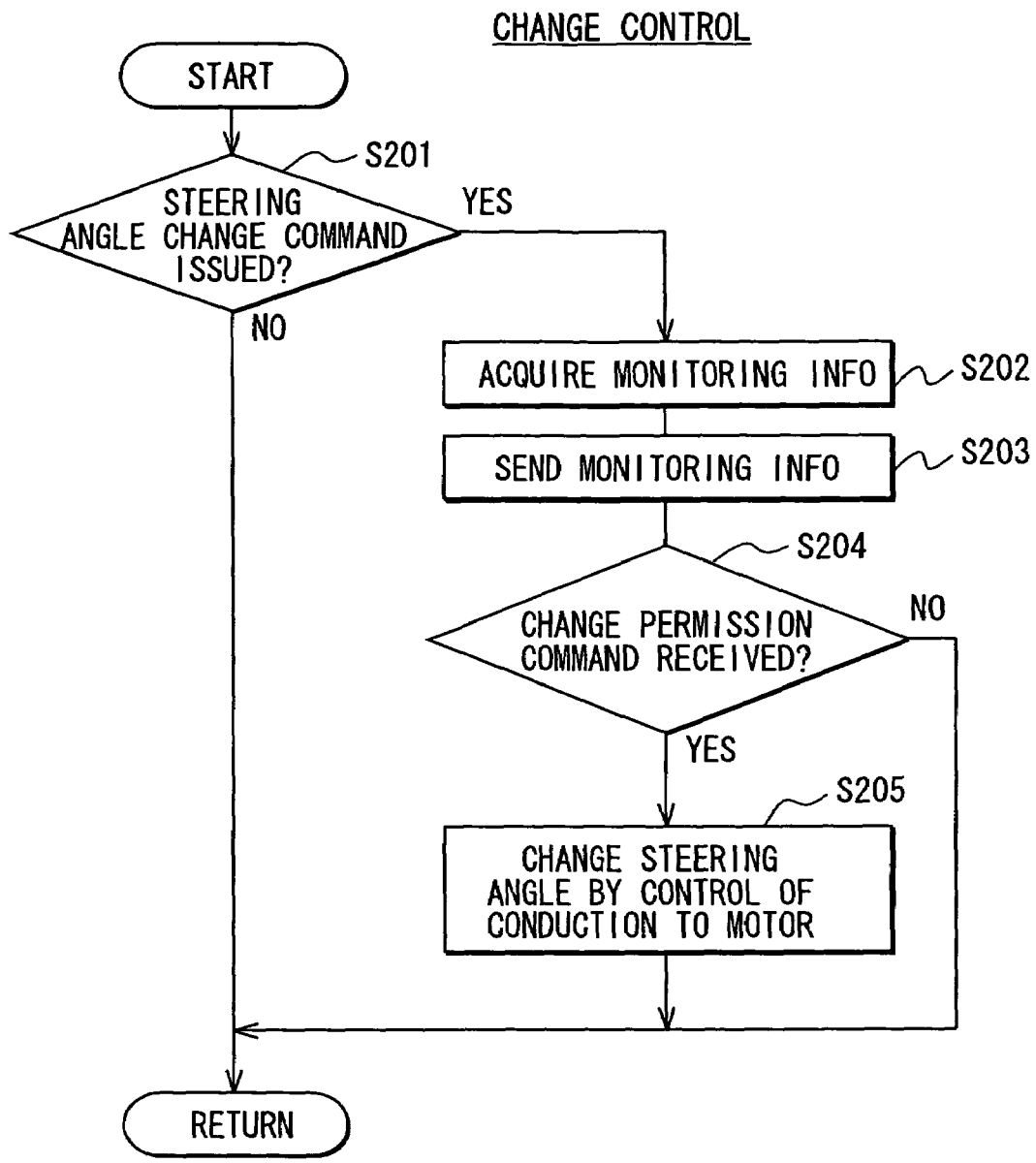
FIG. 22 is a flowchart showing a change control flow according to the ninth embodiment.

In the ninth embodiment described above, the by-wire ECU 320 performs a change control flow operation shown in FIG. 22 to change a steering angle of the steering wheels 310. Specifically, in Step S201, the by-wire ECU 320 determines whether a steering change command has been issued from the vehicle passenger on the basis of the detection signal of the handle angle sensor 321.

When negative determination has been made in Step S201, the by-wire ECU 320 executes Step S201 again without executing other steps. On the other hand, when affirmative determination has been made in Step S201, the by-wire ECU 320 acquires, in Step S202, monitoring information for letting the engine ECU 11 monitor the steer-by-wire system 300. Specifically, the monitoring information acquired in this embodiment includes an actual steering angle at the time of execution of Step S202, a target steering angle decided by the steering angle change command confirmed in Step S201, and a target rotation direction of the electric motor 32. The actual steering angle is acquired on the basis of the detection signal of the rotational angle sensor 313, and the target steering angle is acquired on the basis of the detection signal of the handle angle sensor 321. The target rotation direction is acquired on the basis of the actual steering angle and the target steering angle thus acquired.

Steps S203 and S204 subsequent to Step S202 have processing contents corresponding respectively to Steps S14 and S15 of the first embodiment (FIG. 4). When affirmative determination has been made in Step S204, the by-wire ECU 320 changes a steering angle in Step S205 by feedback-controlling conduction to the electric motor 312 so that the actual steering angle matches the target steering angle, and then executes Step S201 again. On the other hand, when negative determination has been made in S204, the by-wire ECU 320 executes Step S201 again without executing Step S205.

Figure 23:
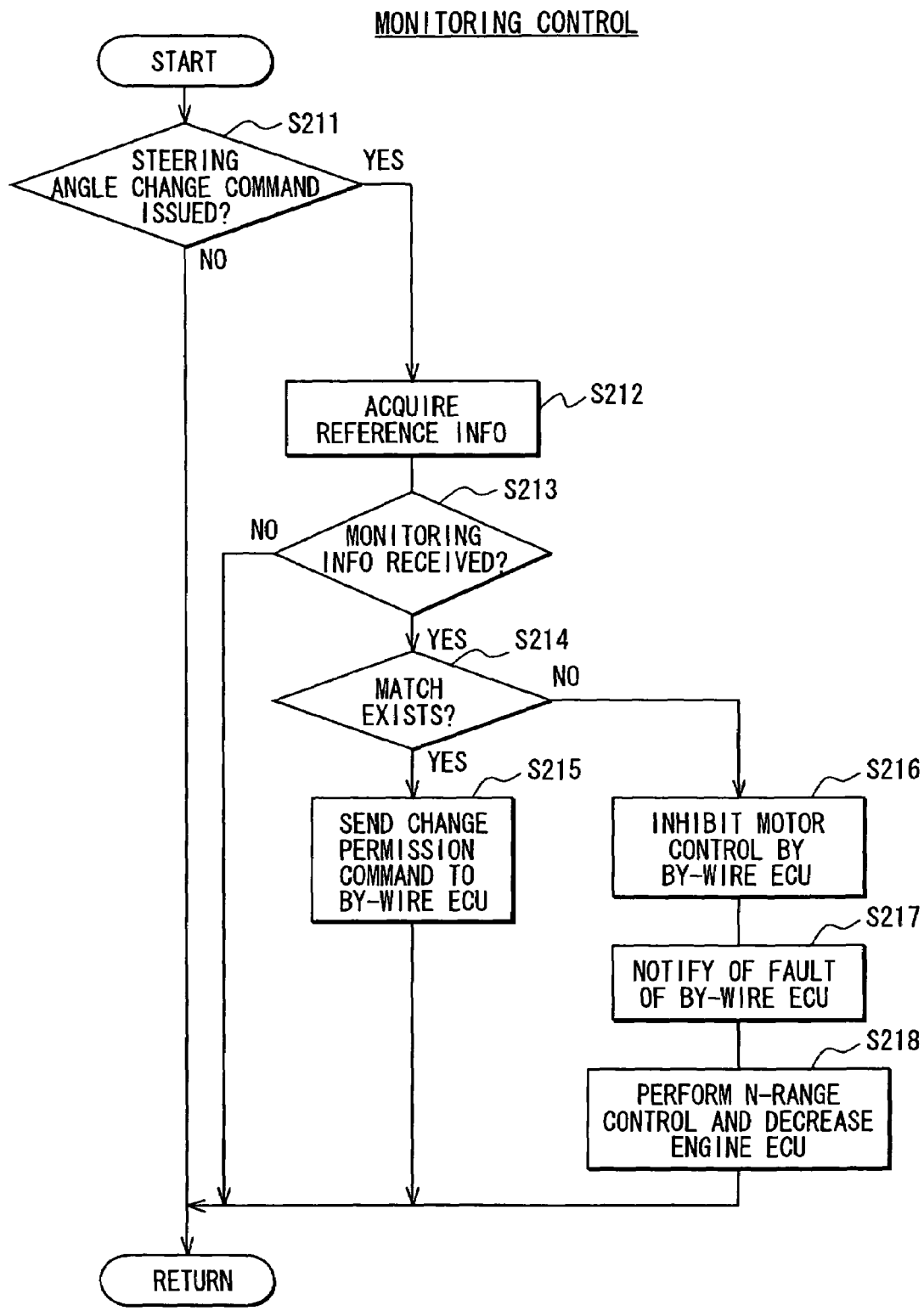
FIG. 23 is a flowchart showing a monitoring control flow according to the ninth embodiment.

In the ninth embodiment, in addition to the execution of the change control flow, the engine ECU 11 for monitoring the steer-by-wire system 300 performs a monitoring control flow shown in FIG. 23. Specifically, in Step S211, the engine ECU 11 determines whether a steering angle change command has been issued on the basis of the detection signal of the handle angle sensor 321 received via the by-wire ECU 320.

When negative determination has been made in Step S211, the engine ECU 11 executes Step S211 again without executing other steps. On the other hand, when affirmative determination has been made in Step S211, the engine ECU 11 acquires, in Step S212, reference information used as reference for monitoring the steer-by-wire system 300. The monitoring information of this embodiment includes an actual steering angle at the time of execution of Step S212, a target steering angle decided by the steering angle change command confirmed in Step S211, and a target rotation direction of the electric motor 312. The actual steering angle is acquired on the basis of the detection signal of the rotational angle sensor 313 received via the by-wire ECU 320, and the target steering angle is acquired on the basis of the detection signal of the handle angle sensor 321 received via the by-wire ECU 320. The target rotation direction is acquired on the basis of the actual steering angle and the target steering angle thus acquired.

Steps S213 to S218 subsequent to Step S212 have processing contents corresponding respectively to Steps S114 to S119 of the sixth embodiment, except that the by-wire ECU 151, the switch device 40, and the electric motor 32 are replaced by the by-wire ECU 320, the switch device 330, and the electric motor 312, respectively.

Thus, in the ninth embodiment, on confirming a fault of the steer-by-wire system 300, the engine ECU 11 inhibits the conduction to the electric motor 312, decreases engine torque, and performs N range control. Therefore, when a fault occurs when the vehicle is running, the vehicle can be stopped without causing steering angle change contrary to the intention of the vehicle passenger. As such, the safety of the vehicle can be ensured.

In the ninth embodiment, a steering angle of the steering wheels 310 corresponds to "vehicle condition" described in the claims, the by-wire ECU 320 corresponds to "by-wire control circuit" described in the claims, and the switch device 330 corresponds to "inhibiting device" described in the claims. Furthermore, in the ninth embodiment, the steering handle 322 having the handle angle sensor 321 corresponds to "command input device" described in the claims, and the steering output system 316 corresponds to "steering angle change device" described in the claims.

Although plural embodiments of the present invention have been so far described, the present invention is not limited to the embodiments shown and described herein.

Figure 24:
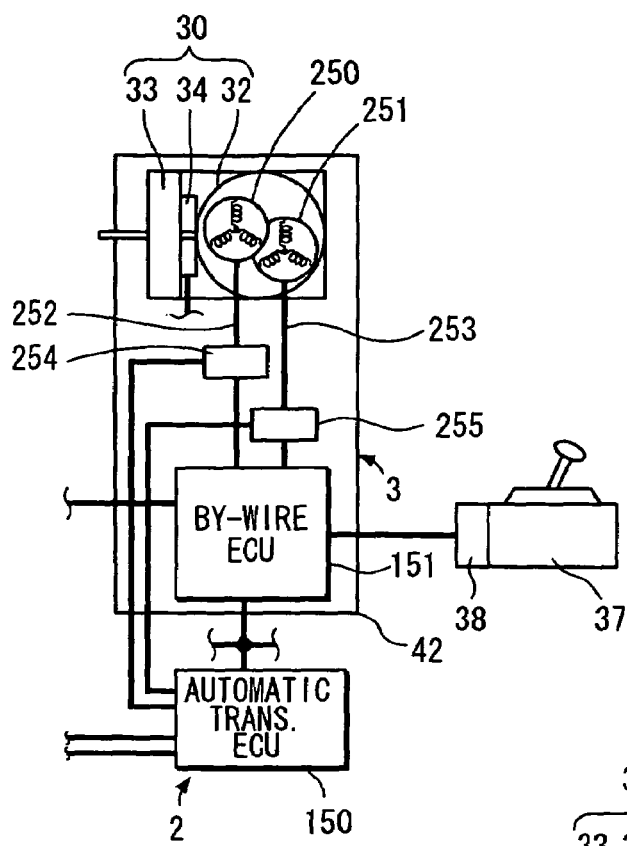
FIG. 24 is a block diagram showing a shift-by-wire system according to a variant of the eighth embodiment.
Figure 25:
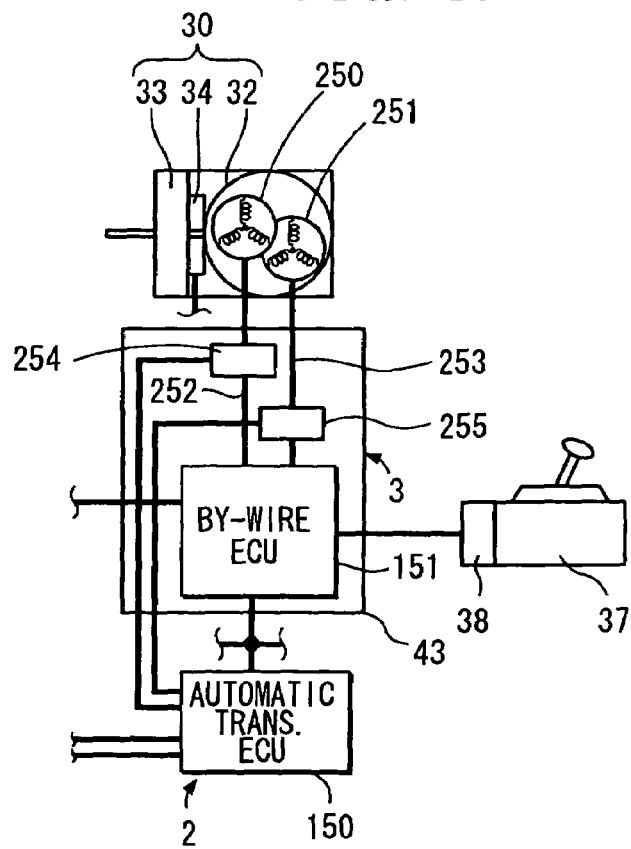
FIG. 25 is a block diagram showing a shift-by-wire system according to a variant of the eighth embodiment.
Figure 26:
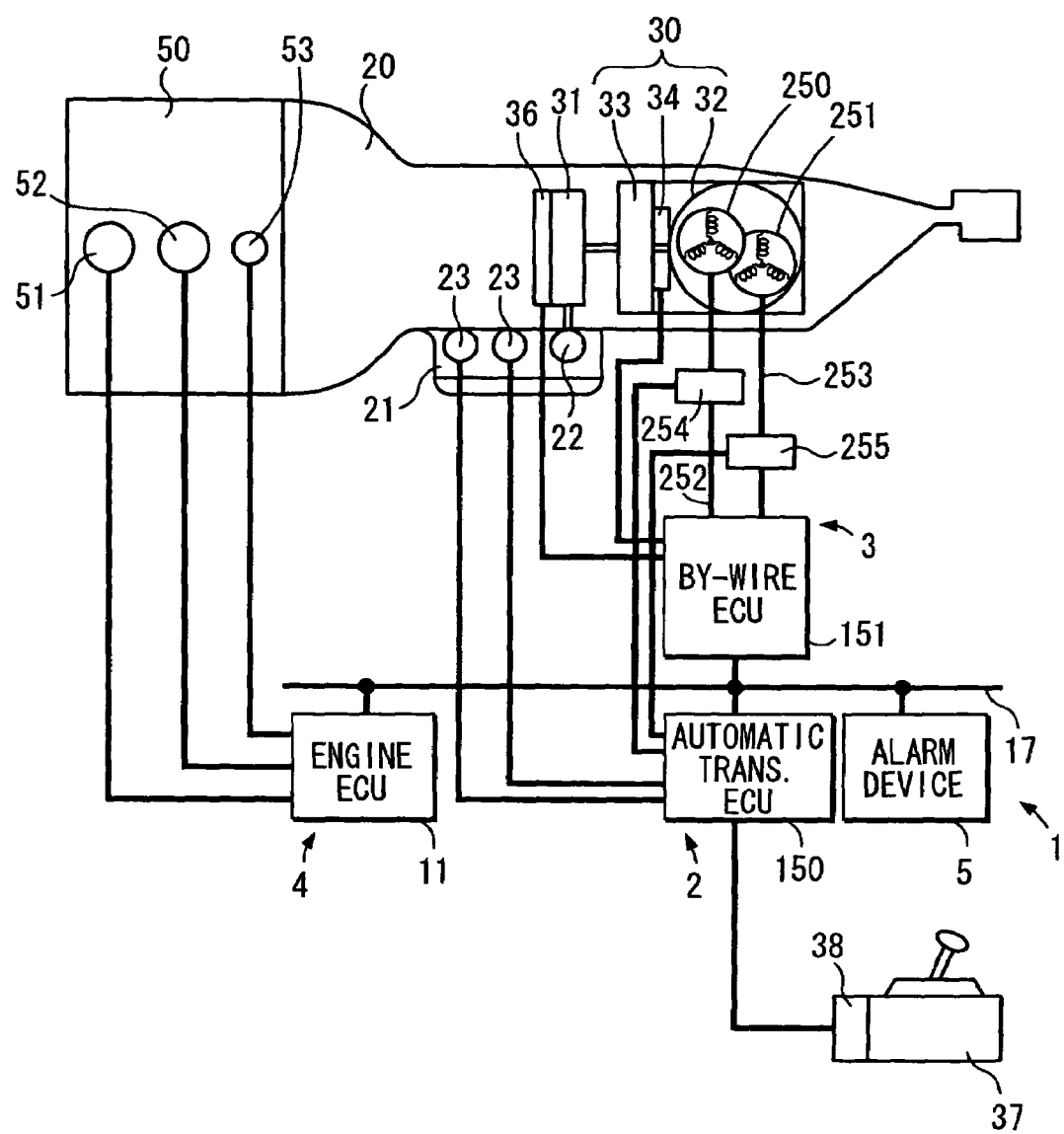
FIG. 26 is a block diagram showing a vehicle control system according to a variant of the eighth embodiment.
Figure 27:
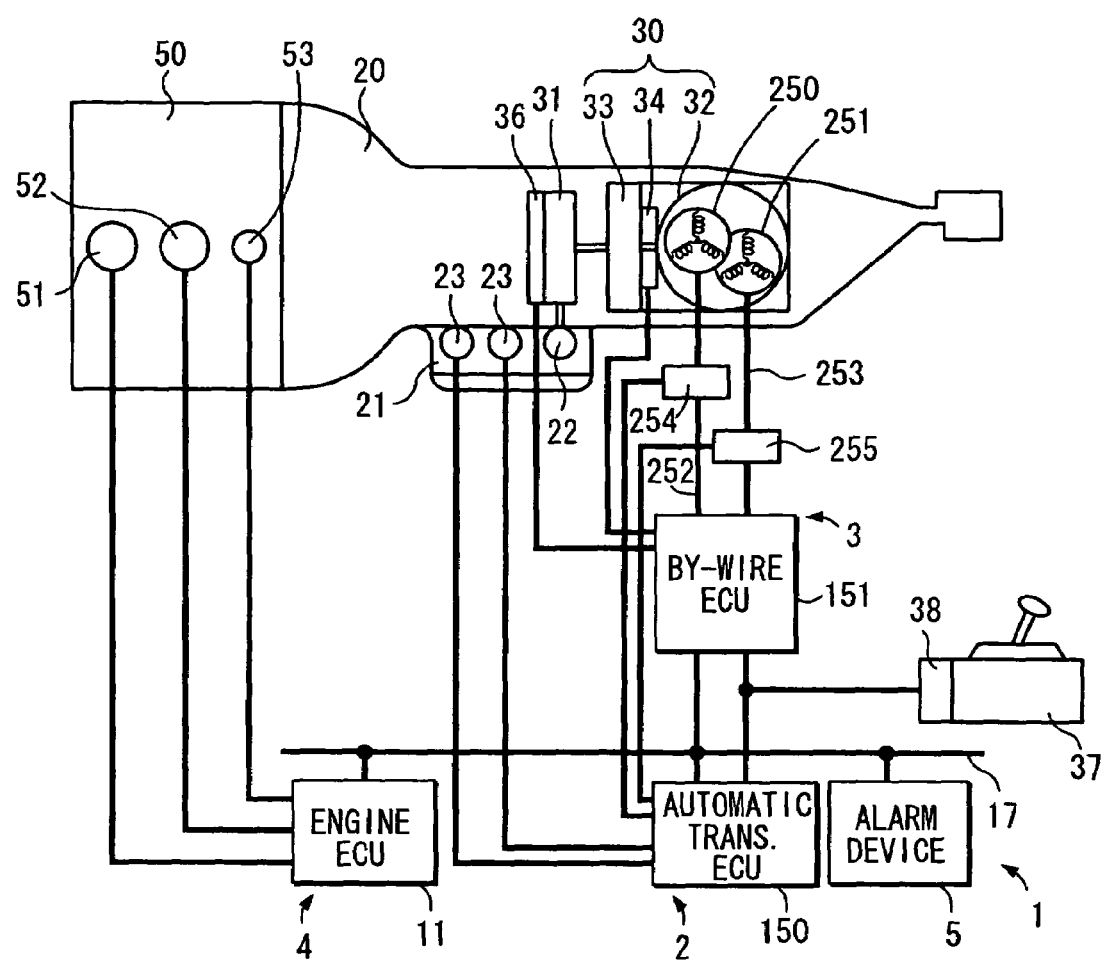
FIG. 27 is a block diagram showing a vehicle control system according to a variant of the eighth embodiment.

For instance, as shown in FIGS. 24 and 25 similarly to the variant of the first embodiment, specific components of the by-wire systems 3 and 300 may be integrated. As shown in FIG. 26, the selector sensor 38 may be connected to the ECUs 11, 150, 200 that perform the monitoring control flow. Furthermore, as shown in FIG. 27 the selector sensor 38 may be connected to the ECUs 10, 151, 320 that execute the change control flow and the ECUs 11, 150, 200 that execute the monitoring control flow.

Figure 28:
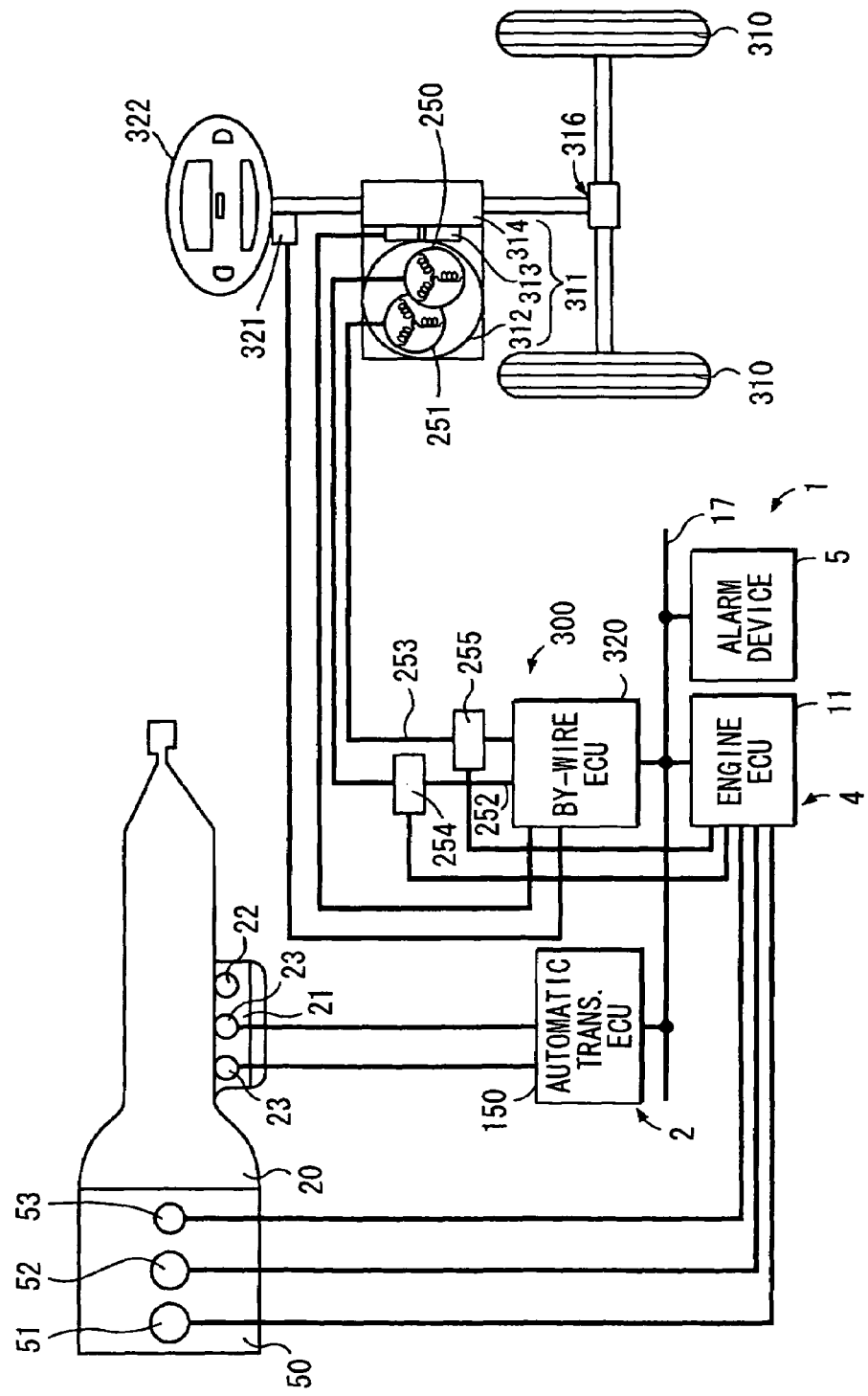
FIG. 28 is a block diagram showing a vehicle control system according to a variant of the ninth embodiment.

Also, the actuators 30, 311 having the electric motors 32, 312 may be actuators having an electromagnetic valve or the like. In the eighth embodiment, an actuator may be used that combines an electric motor with three or more driving parts, conduction passages, and switch devices that correspond individually to the driving parts. In addition, as shown in FIG. 28 an actuator may be used that combines an electric motor with plural driving parts, conduction passages, and switch devices that correspond individually to the driving parts.

Moreover, in the first to ninth embodiments, when Steps S16, S76, S136, S170, and S205 (i.e., changing a range of steering angle of the change control flow) are executed later than Steps S27, S57, S87, S117, S147, S195, and S216 (i.e., inhibiting the motor control of the monitoring control flow), respectively, the subsequent steps may be avoided: Steps S26, S56, S86, S116, S146, S194, and S215 (i.e., sending a change permission command of the monitoring control flow) and Steps S15, S75, S135, S169, and S204 (i.e., receiving a change permission command of the change control flow). In the second to ninth embodiments, in Steps S59, S89, S119, S149, S184, S188, S197, and S218 of the monitoring control flow, the operation of decreasing engine torque may be avoided. Additionally, in the third to ninth embodiments, the brake control system 100 of the second embodiment may be provided to additionally perform a brake operation similar to Step S59 of the second embodiment in Steps S89, S119, S149, S184, S188, S197, S218 of the monitoring control flow.

Still further, in the eighth embodiment, Steps S162 and S164 of the change control flow that send fault information, and Steps S181 to S188 of the monitoring control flow executed when fault information is received may be avoided. Also, in the eighth embodiment, without executing Steps S162 and S164 of the change control flow that send fault information, the automatic transmission ECU 150 may execute a step of detecting a fault on the basis of monitoring information (e.g., coil current) from the driving parts 250, 251, in place of Steps S181 and S185 of the monitoring control flow. Furthermore, in the eighth embodiment, Steps 183 and S187 of the monitoring control flow that make notification of a fault of the driving parts may be respectively executed after the affirmative determination in Steps S161 and S163 of the change control flow.

In the eighth embodiment, a construction similar to that in the sixth embodiment that can perform the monitoring control flow by the engine ECU 11 may be adopted. In the ninth embodiment, a construction similar to that in the third embodiment that can perform the monitoring control flow by the automatic transmission ECU 150 may be adopted. In the first, eighth, and ninth embodiments, a construction similar to that in the seventh embodiment that can perform the monitoring control flow by the collective ECU 200 may be adopted.

In the ninth embodiment, an equivalent of the shift-by-wire system 3 in the first to eight embodiments may be added to additionally perform the monitoring control flow of the system 3. In this case, ECUs that perform the change control flow in the systems 300 and 3 may be identical with or different from each other. Also, ECUs that perform the monitoring control flow in the systems 300, 3 may be identical with or different from each other.

What is claimed is:

1. A vehicle control system, comprising:
   a by-wire system including an actuator for changing vehicle conditions and a by-wire control circuit that electrically controls the actuator according to a command for changing the vehicle conditions by a vehicle passenger;
   a monitoring control device that comprises a control circuit different from the by-wire control circuit and monitors the by-wire system on the basis of monitoring information received from the by-wire system, the control circuit of the monitoring control device being provided to control another actuator different from the actuator controlled by the by-wire control circuit; and
   an inhibiting device that inhibits the control of the actuator by the by-wire control circuit on receiving a control command from the monitoring control device when the monitoring control device confirms a fault of the by-wire system.

2. The vehicle control system according to claim 1, wherein the inhibiting device inhibits the control of the actuator by the by-wire control circuit by disconnecting a conduction passage between the by-wire control circuit and the actuator.

3. The vehicle control system according to claim 1, wherein the monitoring control device acquires reference information used as reference to monitor the by-wire system, and determines a fault of the by-wire system on the basis of a result of comparison between the monitoring information and the reference information.

4. The vehicle control system according to claim 3, wherein both the monitoring information and the reference information include target condition information indicating vehicle conditions targeted on the basis of a change command.

5. The vehicle control system according to claim 4, wherein the by-wire control circuit and the monitoring control device are connected in parallel to a command input device to which the change command is inputted from a vehicle passenger, and which outputs a signal corresponding to the change command.

6. The vehicle control system according to claim 4, wherein the by-wire control circuit and the monitoring control device are connected in series to a command input device to which the change command is inputted from a vehicle passenger, and which outputs a signal corresponding to the change command.

7. The vehicle control system according to claim 1, wherein the monitoring control device includes an engine control circuit that electrically controls a vehicle engine.

8. The vehicle control system according to claim 7, wherein the monitoring control device, when confirming a fault of the by-wire system controls the vehicle engine by at least one of decreasing engine torque and stopping the vehicle engine.

9. The vehicle control system according to claim 1, wherein the monitoring control device includes a brake control circuit that electrically controls an actuating device for actuating a vehicle brake.

10. The vehicle control system according to claim 9, wherein the monitoring control device controls the actuating device to actuate the vehicle brake when confirming a fault of the by-wire system.

11. The vehicle control system according to claim 1, wherein the monitoring control device includes an automatic transmission control circuit that electrically controls a switching device for switching friction elements to be engaged in an automatic transmission of a vehicle.

12. The vehicle control system according to claim 11, wherein the monitoring control device realizes a neutral range by controlling the switching device when confirming a fault of the by-wire system.

13. The vehicle control system according to claim 1, wherein the actuator includes plural driving parts that individually generate a driving force to change the vehicle conditions,
   wherein the by-wire control circuit controls the plural driving parts via individual conduction passages,
   wherein the inhibiting device includes plural inhibiting parts individually corresponding to the plural driving parts, and the inhibiting parts receive a control command from the monitoring control device that confirms a fault of a corresponding driving part, and inhibits the control of the corresponding driving part by the by-wire control circuit.

14. The vehicle control system according to claim 13,
wherein the by-wire control circuit, when detecting a fault in at least one of the plural driving parts, sends the monitoring information indicating the relevant faulty driving part to the monitoring control device, and
wherein the monitoring control device inhibits the control of the faulty driving part by the by-wire control circuit by giving a control command to an inhibiting part corresponding to the faulty driving part indicated by the monitoring information of the plural inhibiting parts.

15. The vehicle control system according to claim 1,
wherein the by-wire system is a shift-by-wire system that includes the actuator that mechanically drives a range switching module for changing a range of an automatic transmission of the vehicle, and the by-wire control circuit electrically controls the actuator according to a command for changing the range.

16. The vehicle control system according to claim 15,
wherein the by-wire control circuit electrically controls a switching device for switching friction elements to be engaged in the automatic transmission.

17. The vehicle control system according to claim 1,
wherein the by-wire system is a steer-by-wire system that includes the actuator that mechanically drives a steering angle change device for changing a steering angle of the vehicle, and the by-wire control circuit electrically controls the actuator according to a command for changing the steering angle.

* * * * *